(12) United States Patent
Kinoshita et al.

(10) Patent No.: US 9,045,033 B2
(45) Date of Patent: Jun. 2, 2015

(54) VIBRATION-DAMPING CONTROLLING APPARATUS

(75) Inventors: Gohki Kinoshita, Susono (JP); Koichiro Muta, Okazaki (JP); Masaya Yamamoto, Toyota (JP); Eiji Fukushiro, Nagoya (JP); Shunsuke Oyama, Aichi-gun (JP); Toshiya Hashimoto, Nishikamo-gun (JP); Takanori Aoki, Nisshin (JP); Akihiro Kimura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 467 days.

(21) Appl. No.: 13/319,897

(22) PCT Filed: May 13, 2009

(86) PCT No.: PCT/JP2009/058900
§ 371 (c)(1),
(2), (4) Date: Nov. 10, 2011

(87) PCT Pub. No.: WO2010/131341
PCT Pub. Date: Nov. 18, 2010

(65) Prior Publication Data
US 2012/0065826 A1    Mar. 15, 2012

(51) Int. Cl.
B60L 11/00 (2006.01)
B60K 6/445 (2007.10)
(Continued)

(52) U.S. Cl.
CPC . *B60K 6/445* (2013.01); *B60K 1/02* (2013.01); *B60K 6/365* (2013.01); *B60L 11/1851* (2013.01); *B60L 2240/647* (2013.01); *B60W 10/06* (2013.01); *B60W 10/08* (2013.01); *B60W 10/26* (2013.01); *B60W 20/00* (2013.01); *B60W 30/025* (2013.01); *B60W 30/20* (2013.01); *B60W 2510/22* (2013.01); *B60W 2510/244* (2013.01); *B60W 2510/246* (2013.01); *B60W 2550/147* (2013.01); *Y02T 10/6239* (2013.01); *Y02T 10/6286* (2013.01); *Y02T 10/7005* (2013.01); *Y02T 10/705* (2013.01);
(Continued)

(58) Field of Classification Search
None
See application file for complete search history.

(56) References Cited

U.S. PATENT DOCUMENTS 5,490,068 A * 2/1996 Shimizu et al. .................. 701/38
5,497,741 A * 3/1996 Tashiro et al. ............. 123/192.1
(Continued)

FOREIGN PATENT DOCUMENTS

JP    A-2001-50077    2/2001
JP    A-2001-54206    2/2001
(Continued)

OTHER PUBLICATIONS

International Search Report mailed Aug. 18, 2009 issued in International Patent Application No. PCT/JP2009/058900 (with translation).

*Primary Examiner* — Jonathan L Sample
(74) *Attorney, Agent, or Firm* — Oliff PLC

(57) ABSTRACT

A sprung vibration damping for suppressing sprung vibration which is generated to a vehicle by an input from a road surface to wheels provided with the vehicle by controlling a torque of a motor, and the sprung vibration damping is subjected to a restriction including a prohibition in response to a state of battery, which supplies power to the motor, such as a voltage and a temperature of the battery or a state of a control, which affects the power of the battery, such as a charge/discharge amount feedback control and the like.

3 Claims, 21 Drawing Sheets

(51) Int. Cl.
  *B60K 6/365* (2007.10)
  *B60L 11/18* (2006.01)
  *B60W 10/06* (2006.01)
  *B60W 10/08* (2006.01)
  *B60W 10/26* (2006.01)
  *B60W 30/02* (2012.01)
  *B60W 30/20* (2006.01)
  *B60K 1/02* (2006.01)
  *B60W 20/00* (2006.01)

(52) U.S. Cl.
  CPC ......... *Y02T 10/7258* (2013.01); *Y02T 10/7291* (2013.01); *Y02T 90/16* (2013.01)

(56) References Cited

U.S. PATENT DOCUMENTS

| | | | |
|---|---|---|---|
| 6,294,854 B1* | 9/2001 | Grosspietsch et al. | 310/92 |
| 6,351,096 B1* | 2/2002 | Jang | 318/811 |
| 6,621,244 B1* | 9/2003 | Kiyomiya et al. | 318/611 |
| 7,599,763 B2* | 10/2009 | Matsumoto et al. | 701/1 |
| 7,630,796 B2 | 12/2009 | Okada et al. | |
| 7,938,410 B2* | 5/2011 | Buma et al. | 280/5.508 |
| 8,001,832 B2* | 8/2011 | Suzuki | 73/114.04 |
| 8,052,570 B2* | 11/2011 | Kumazaki et al. | 477/5 |
| 8,083,243 B2* | 12/2011 | Hamada et al. | 280/124.1 |
| 8,191,874 B2* | 6/2012 | Inoue et al. | 267/64.24 |
| 8,240,679 B2* | 8/2012 | Kajino | 280/5.515 |
| 8,340,864 B2* | 12/2012 | Itabashi et al. | 701/37 |
| 8,423,243 B2* | 4/2013 | Harima | 701/37 |
| 2004/0204286 A1* | 10/2004 | Stridsberg | 477/14 |
| 2005/0038576 A1* | 2/2005 | Hara et al. | 701/22 |
| 2006/0113129 A1* | 6/2006 | Tabata | 180/65.2 |
| 2008/0079280 A1* | 4/2008 | Nakamura et al. | 296/35.3 |
| 2008/0085202 A1* | 4/2008 | Namiki et al. | 417/540 |
| 2009/0160380 A1* | 6/2009 | Yamada et al. | 318/400.15 |
| 2009/0171523 A1* | 7/2009 | Luo et al. | 701/22 |
| 2009/0283942 A1* | 11/2009 | Nakamura | 267/64.13 |
| 2010/0004806 A1* | 1/2010 | Soma | 701/22 |
| 2010/0013174 A1* | 1/2010 | Buma et al. | 280/5.507 |
| 2010/0032912 A1* | 2/2010 | Inoue | 280/5.502 |
| 2010/0230876 A1* | 9/2010 | Inoue et al. | 267/140.14 |
| 2010/0241305 A1* | 9/2010 | Itabashi et al. | 701/34 |
| 2011/0266760 A1* | 11/2011 | Itabashi | 280/5.507 |
| 2012/0265400 A1* | 10/2012 | Oikawa | 701/37 |

FOREIGN PATENT DOCUMENTS

| | | |
|---|---|---|
| JP | A-2006-67655 | 3/2006 |
| JP | A-2006-69472 | 3/2006 |
| JP | A-2007-55435 | 3/2007 |
| JP | A-2007-124868 | 5/2007 |
| JP | A-2007-137107 | 6/2007 |
| JP | A-2008-179277 | 8/2008 |
| JP | A-2008-220129 | 9/2008 |
| JP | A-2009-113772 | 5/2009 |

* cited by examiner

VIBRATION-DAMPING CONTROLLING APPARATUS

FIELD

The present invention relates to a vibration-damping controlling apparatus. In particular, the present invention relates to a vibration-damping controlling apparatus that suppresses vibration on a vehicle body side nearer than a suspension device of a vehicle.

BACKGROUND

While a vehicle travels, since so-called sprung vibration, which is vibration on a vehicle body side nearer than a suspension of the vehicle, is generated by a driving operation executed by a driver and a disturbance while the vehicle travels, an attitude of the vehicle changes and thus vertical loads of respective wheels may be changed by the change of the attitude. Since the vertical loads make an influence on cornering forces generated in the wheels, when the vertical loads of the respective wheels change, the cornering forces of the respective wheels are changed as vertical loads change. When the cornering forces of the respective wheels change as described above, a balance of the cornering forces in an overall vehicle may be changed. When the balance of the cornering forces in the overall vehicle is changed, a behavior of the vehicle may become unstable. Therefore, in conventional vehicles, there is a vehicle which suppresses the change of attitude of the vehicle.

For example, in a vehicle stabilization control system described in Patent Literature 1, pitching vibration in response to a present driving force is determined based on a vehicle body sprung vibration model state equation and the like and a correction value is determined by which the thus determined pitching vibration becomes promptly becomes to 0. Further, pitching vibration, which is a kind of sprung vibration, is suppressed by correcting required engine torque based on the correction value. That is, the required engine torque is corrected by a correction value for suppressing the pitching vibration and the engine is controlled so that the torque generated in the engine becomes the required engine torque after it is corrected, thereby the pitching vibration is suppressed. With the operation, a change of attitude of a vehicle can be suppressed, and a behavior of the vehicle can be stabilized when the vehicle travels.

Patent Literature 1: Japanese Patent Application Laid-open No. 2006-69472

SUMMARY

Technical Problem

Among recent vehicles, there is a so-called hybrid vehicle which uses an engine as an internal combustion engine together with a motor operated by electricity as power sources when a vehicle travels. The hybrid vehicle generates a required driving force required by a driver by appropriately operating the engine and the motor in response to a traveling state of the vehicle. Further, when sprung vibration is suppressed in the hybrid vehicle, that is, when sprung vibration damping control is executed, torque generated in the engine and torque generated in the motor are corrected by a correction value that can execute the sprung vibration damping control likewise a case in which the pitching vibration is suppressed by the vehicle stabilization control system described in Patent Literature 1. With the operation, the sprung vibration damping control can be executed also in the hybrid vehicle.

When the sprung vibration damping control is executed in the hybrid vehicle, although the sprung vibration damping control is executed not only by correcting the torque of the engine but also by correcting the torque of the motor as described above, the motor is mounted on the vehicle and operated by the power of a battery which is used also to other control of the vehicle. Therefore, when the sprung vibration damping control is executed by correcting torque of the motor, although the power of the battery is used by the sprung vibration damping control and by the other control, the power of the battery may not be stably used to these controls depending on a state of the battery. Therefore, the sprung vibration damping control and the other control which use the power of the battery may not be stably executed.

Further, although a battery is deteriorated by repeating a charge and a discharge, when the battery is deteriorated, since the battery cannot appropriately generates power, a control, which is executed using the power of the battery, cannot be appropriately executed in the case. In particular, since the battery has a different degree of deterioration depending on a state of use, when the state of use is not good, the deterioration is accelerated and the control executed using the power of the battery is unlike to be more appropriately executed. As described above, when the sprung vibration damping control is executed by correcting the torque of the motor, there is a case that the other control cannot be appropriately executed.

An object of the present invention, which was made in view of the above circumstances, is to provide a vibration-damping controlling apparatus capable of suppressing an influence on the other control which is caused by executing an sprung vibration damping control.

Solution to Problem

In order to solve the above mentioned problem and achieve the object, in a vibration-damping controlling apparatus, according to the present invention, for suppressing sprung vibration generated to a vehicle by an input from a road surface to wheels provided with the vehicle by controlling a driving force of the vehicle, a sprung vibration damping as a suppression of the sprung vibration is executed by controlling a torque of a motor disposed as a power source when at least the vehicle travels, and the sprung vibration damping, which is executed by controlling the torque of the motor, is restricted in response to a state of a battery which supplies power to the motor or to a state of a control which makes an influence on a power of the battery.

Further, in the vibration-damping controlling apparatus according to the present invention, the vehicle further includes an internal combustion engine as a power source in traveling, and the sprung vibration damping is restricted at a time at which the internal combustion engine starts or stops.

Further, in the vibration-damping controlling apparatus according to the present invention, the sprung vibration damping is restricted at the time at which the internal combustion engine starts or stops as well as when a voltage of the battery is equal to or more than an upper limit threshold value or equal to or less than a lower limit threshold value.

Further, in the vibration-damping controlling apparatus according to the present invention, the upper limit threshold value and the lower limit threshold value of the voltage of the battery are changed by a temperature of the battery.

Further, in the vibration-damping controlling apparatus according to the present invention, the sprung vibration damping is restricted at the time at which the internal combustion engine starts or stops as well as when a current of the battery is equal to or more than an upper limit threshold value or equal to or less than a lower limit threshold value.

Further, in the vibration-damping controlling apparatus according to the present invention, the upper limit threshold value and the lower limit threshold value of the current of the battery are changed by the temperature of the battery.

Further, in the vibration-damping controlling apparatus according to the present invention, the vehicle includes an internal combustion engine as a power source in traveling and a purification means that purifies an exhaust gas exhausted from the internal combustion engine, and the sprung vibration damping is restricted when a warming requirement of the purification means is made.

Further, in the vibration-damping controlling apparatus according to the present invention, the sprung vibration damping is restricted when the temperature of the battery is equal to or more than an upper limit threshold value or equal to or less than a lower limit threshold value.

Further, in the vibration-damping controlling apparatus according to the present invention, the vehicle includes a self-failure diagnosis controlling means that executes a self-failure diagnosis control, and the sprung vibration damping is restricted when the self-failure diagnosis control is executed.

Further, in the vibration-damping controlling apparatus according to the present invention, the vehicle includes a charge/discharge amount feedback controlling means that executes a charge/discharge amount feedback control as a control for adjusting a charge amount to the battery and a discharge amount from the battery in response to a charge amount of the battery, and the sprung vibration damping is restricted while the charge/discharge amount feedback control is executed.

Further, in the vibration-damping controlling apparatus according to the present invention, while the sprung vibration damping is executed, the charge/discharge amount feedback control is restricted.

Advantageous Effects of Invention

The vibration-damping controlling apparatus according to the present invention achieves an effect that an influence on the other control caused by the execution of the sprung vibration damping control can be suppressed.

REFERENCE SIGNS LIST

1 VEHICLE
2, 90, 100, 110, 120, 130 VIBRATION-DAMPING CONTROLLING APPARATUS
3 HYBRID DEVICE
5 ENGINE
10 MOTOR
11 GENERATOR
12 POWER DIVIDING MECHANISM
14 BATTERY
20 WHEEL
45 CATALYST
46 CATALYST TEMPERATURE SENSOR
47 AIR-FUEL RATIO SENSOR
50 MAIN ECU
51 ENGINE ECU
52 MOTOR ECU
53 BATTERY ECU
63 DRIVING FORCE CONTROLLER
66 SPRUNG VIBRATION DAMPING CONTROLLER
67 ENGINE OPERATION STATE DETERMINING UNIT
76 CATALYST TEMPERATURE OBTAINING UNIT
77 AIR-FUEL RATIO OBTAINING UNIT
86 VOLTAGE OBTAINING UNIT
87 CURRENT OBTAINING UNIT

91 VOLTAGE DETERMINING UNIT
92, 112 BATTERY TEMPERATURE OBTAINING UNIT
93 CURRENT DETERMINING UNIT
101 CATALYST WARMING REQUIREMENT DETERMINING UNIT
102 CATALYST WARMING DETERMINING UNIT
111 BATTERY TEMPERATURE DETERMINING UNIT
121 CATALYST DETERIORATION OBD CONTROLLER
122 AIR-FUEL RATIO SENSOR OBD CONTROLLER
123 OBD EXECUTION STATE DETERMINING UNIT
131 CHARGE/DISCHARGE AMOUNT FEEDBACK CONTROL EXECUTION STATE DETERMINING UNIT
132 SPRUNG VIBRATION DAMPING CONTROL EXECUTION STATE DETERMINING UNIT
133 CHARGE/DISCHARGE AMOUNT FEEDBACK CONTROL AMOUNT CALCULATING UNIT

DESCRIPTION OF EMBODIMENTS

Embodiments of a vibration-damping controlling apparatus according to the present invention will be explained below in detail based on the drawings. Note that the present invention is by no means limited by the embodiments. Further, components in the embodiments include components which can be easily replaced by a person skilled in the art or which are substantially the same components.

First Embodiment

Figure 1:
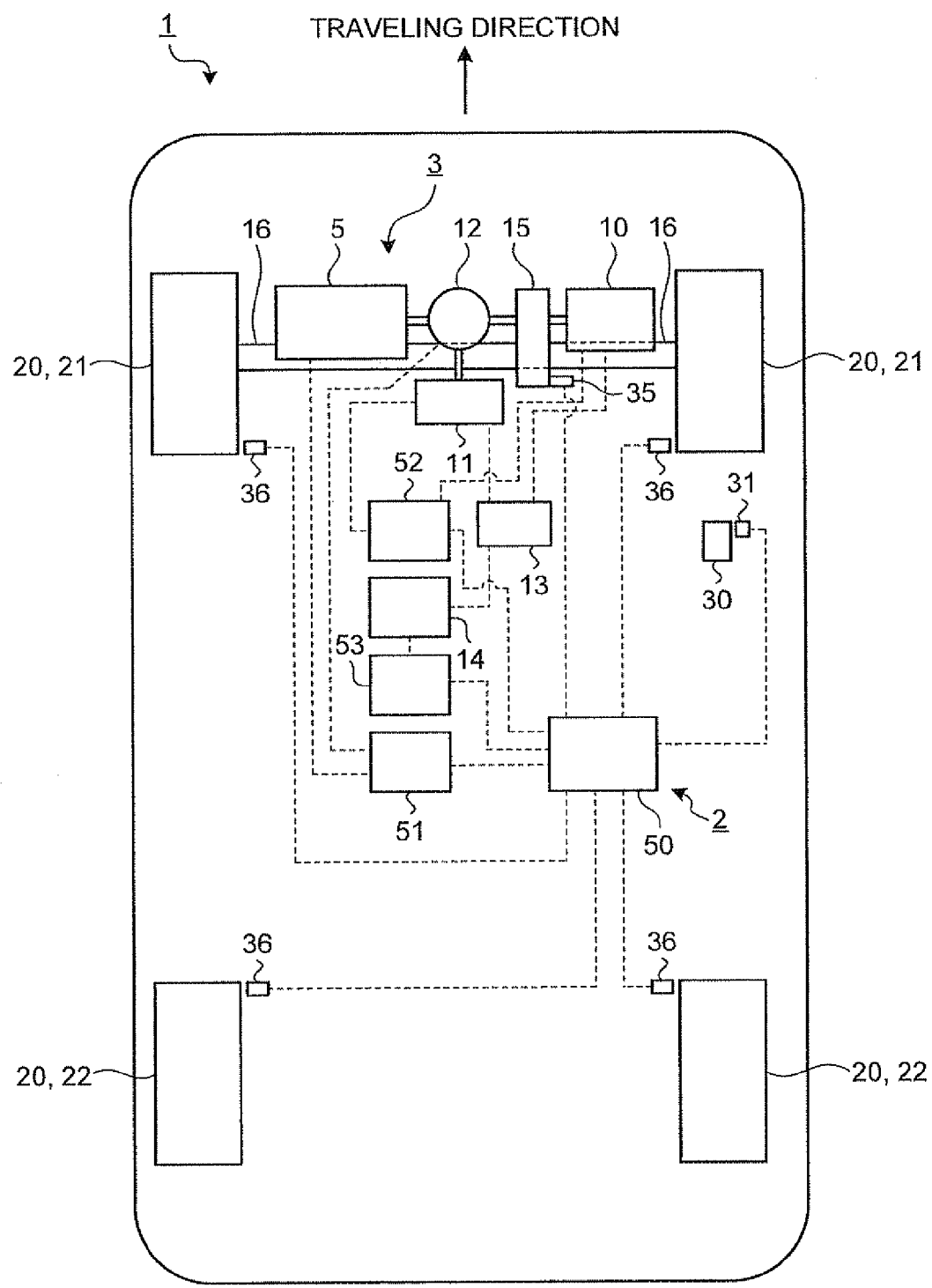
FIG. 1 is a main portion schematic view of a vehicle having a vibration-damping controlling apparatus according to a first embodiment of the present invention.

FIG. 1 is a main portion schematic view of a vehicle having a vibration-damping controlling apparatus according to a first embodiment of the present invention. In the following explanation, a traveling direction when a vehicle 1 ordinarily travels is defined as forward and an opposite direction of the traveling direction is defined as backward. Further, sprung vibration in the following explanation is vibration which is input from a road surface to a wheel of the vehicle and generated in a vehicle body via a suspension, for example, vibration having a frequency component of, for example, 1 to 4 Hz and more specifically a frequency component near to about 1.5 Hz, and the sprung vibration of the vehicle includes a component in a pitch direction or in a bounce direction (vertical direction) of the vehicle. Further, a sprung vibration damping suppresses the sprung vibration of the vehicle.

The vehicle 1 shown in FIG. 1 includes a vibration-damping controlling apparatus 2 according to the first embodiment, the vehicle 1 includes a hybrid device 3 having an engine 5 as an internal combustion engine and a motor (motor generator) 10 operated by electricity, and the engine 5 and the motor 10 are provided together as power sources that generate power when the vehicle 1 travels. Further, the hybrid device 3 includes a generator (motor generator) 11 that receives the output of the engine 5 and generates power, and the engine 5 and the generator 11 are connected by a power dividing mechanism 12. Further, the power dividing mechanism 12 and the motor 10 are connected together to a speed reducer 15, and the speed reducer 15 is connected to front wheels 21, which are disposed as driving wheels of wheels 20 provided with the vehicle 1 via a drive shaft 16. Among them, the power dividing mechanism 12 distributes the output of the engine 5 to the generator 11 and the speed reducer 15.

Further, the speed reducer 15 reduces the output of the engine 5 and the output of the motor 10 transmitted via the power dividing mechanism 12 and transmits the reduced outputs to the front wheels 21 as the driving wheels. That is, the speed reducer 15 is disposed to a power transmission path from the engine 5 to the front wheels 21 and to a power transmission path from the motor 10 to the front wheels 21 as well as provided as a gear changing means that changes the speeds of the output of the engine 5 and the output of the motor 10 and transmits the outputs in a direction of the front wheels 21. The speed reducer 15 disposed as described above is provided with a vehicle speed sensor 35 as a vehicle speed detecting means that can detect a vehicle speed by detecting a rotation speed of an output shaft (not shown) of the speed reducer 15. Further, the power dividing mechanism 12 is provided as a power dividing means that can divide the output of the engine 5 to the output to the generator 11 and to a driving force when the vehicle 1 travels.

The motor 10 is an alternating current synchronous motor, connected to an inverter 13, and driven by alternating current power. The inverter 13 is disposed so as to be capable of converting the power stored in a battery 14, which is a chargeable battery mounted on the vehicle 1, from a direct current to an alternating current and supplying the alternating current to the motor 10 as well as converting the power generated by the generator 11 from an alternating current to a direct current and storing the direct current in the battery 14. As described above, the battery 14 is disposed as a power supply of the motor 10 when the motor 10 is driven, and further the generator 11 is disposed as a power generating means that can generate power by the output of the engine 5 as well as can charge the generated electricity to the battery 14. The generator 11 basically has also approximately the same configuration as the motor 10 described above and has a configuration as an alternating current synchronous motor. In the case, the motor 10 mainly outputs a driving force, whereas the generator 11 mainly achieves a role of receiving the output of the engine 5 and generating power.

Further, although the motor 10 mainly generates the driving force, the motor 10 can generate also power (regenerative power) making use of the rotation of the front wheels 21 and can function also as a generator. In the case, since it is possible to apply a regenerative brake to the front wheels 21 by generating regenerative torque by the motor 10, the vehicle 1 can be braked using the regenerative brake together with a foot brake and an engine brake as an ordinary brake means. In contrast, although the generator 11 generates power by mainly receiving the output of the engine 5, the generator 11 can function also as a motor which is driven by receiving a power of the battery 14 via the inverter 13.

Further, the engine 5, the motor 10, the generator 11, and the power dividing mechanism 12 are connected to an Electronic Control Unit (ECU), respectively and disposed so as to be controlled by the ECU. More specifically, the engine 5 and the power dividing mechanism 12 are connected to an engine ECU 51 that controls the engine 5 and the power dividing mechanism 12, and the motor 10 and the generator 11 are connected to a motor ECU 52 that controls the motor 10 and the generator 11. With the configuration, the engine 5 and the power dividing mechanism 12 can be controlled by the engine ECU 51, and the motor 10 and the generator 11 can be controlled by the motor ECU 52. Further, the battery 14 is connected to a battery ECU 53 that monitors a charge amount of the battery 14 as an electricity remaining amount.

Further, the engine ECU 51, the motor ECU 52, and the battery ECU 53 are connected to a main ECU 50, and the drive executed by the engine 5 and the drives executed by the motor 10 and the generator 11 are comprehensively controlled by the main ECU 50. That is, a distribution of the output of the engine 5 and the outputs by the motor 10 and the generator 11 is determined by the main ECU 50, and respective control commands are output from the main ECU 50 to the engine ECU 51 and the motor ECU 52 to control the engine 5, the motor 10, and the generator 11 in response to the determination. Further, the engine ECU 51 and the motor ECU 52 output the information of the engine 5, the motor 10, and the generator 11 to the main ECU 50.

Further, the battery ECU 53 monitors a charge state of the battery 14, and when the charge amount is insufficient, the battery ECU 53 outputs a charge requirement command to the main ECU 50. The main ECU 50, which receives the charge requirement command, increases the output of the engine 5 as well as controls the power dividing mechanism 12, and increases a power generation amount in the generator 11 by increasing an output to be transmitted to the generator 11 of the output of the engine 5, and increases a regenerative amount at the time a speed is reduced, thereby executing a control for increasing the charge amount. Further, when the charge amount increases more than necessary, the battery ECU 53 outputs a discharge requirement command to the main ECU 50 so that the main ECU 50 is caused to use the power of the battery 14 and to positively execute a discharge operation. Further, the battery ECU 53 monitors the power of the battery 14 so as to monitor the charge amount and the discharge amount and outputs a charge requirement command and a discharge requirement command to the main ECU 50 so that charge power and discharge power do not become large power.

As described above, the battery ECU 53 and the main ECU 50 monitor the charge amount and the power of the battery 14 and execute a charge/discharge amount feedback control which is a control for adjusting the charge amount and the discharge amount so as to keep the charge/discharge amount of the battery 14 to a proper amount in response to the charge amount and the power. Therefore, the battery ECU 53 and the main ECU 50 are provided as also a charge/discharge amount feedback controlling means that executes a charge/discharge amount feedback control.

Further, the front wheels 21 are provided as the driving wheels to which the outputs of the engine 5 and the motor 10 are transmitted as well as provided also as steering wheels of the vehicle 1, that is, the front wheels 21 function as the driving wheels and also the steering wheels. That is, the front wheels 21, which are provided also as the steering wheels, are disposed so as to be steered by a steering wheel (illustration omitted) disposed to a driver's seat of the vehicle 1.

Note that although the vehicle 1 is configured as a front-wheel drive vehicle, in which the outputs of the engine 5 and the motor 10 are transmitted to the front wheels 21 and the front wheels 21 generate the driving force, the vehicle 1, which includes the vibration-damping controlling apparatus 2 according to the first embodiment, may be a rear-wheel drive vehicle in which rear wheels 22 function as the driving wheels and generate the driving force or may be a four-wheel drive vehicle in which both the front wheels 21 and the rear wheels 22 function as the driving wheels and generate the driving force. The vibration-damping controlling apparatus 2 according to the first embodiment can be applied regardless a drive type of the vehicle 1.

Further, in the vehicle 1, an accelerator pedal 30 is disposed in the vicinity of a foot of a driver in a state that the driver sits on the driver's seat of the vehicle 1 so as to be operated when the output of the engine 5 is adjusted. An accelerator opening degree sensor 31 as an accelerator degree of opening detecting means that can detect a degree of opening of the accelerator pedal 30 is disposed in the vicinity of the accelerator pedal 30.

Further, braking devices (illustration is omitted) are disposed in the vicinity of the respective wheels 20 so that the vehicle 1 can be braked by generating a braking force between the wheels 20 a road surface by reducing the rotation of the wheels 20 when the braking devices are operated. Further, a wheel speed sensor 36 as a wheel speed detecting means that detects the rotation speed of the wheels 20 is disposed in the vicinity of the respective wheels 20. The wheel speed sensor 36 can independently detect wheel speeds of the respective wheels 20, respectively. The accelerator opening degree sensor 31, the wheel speed sensor 36, and the vehicle speed sensor 35 are connected together to the main ECU 50.

Figure 2:
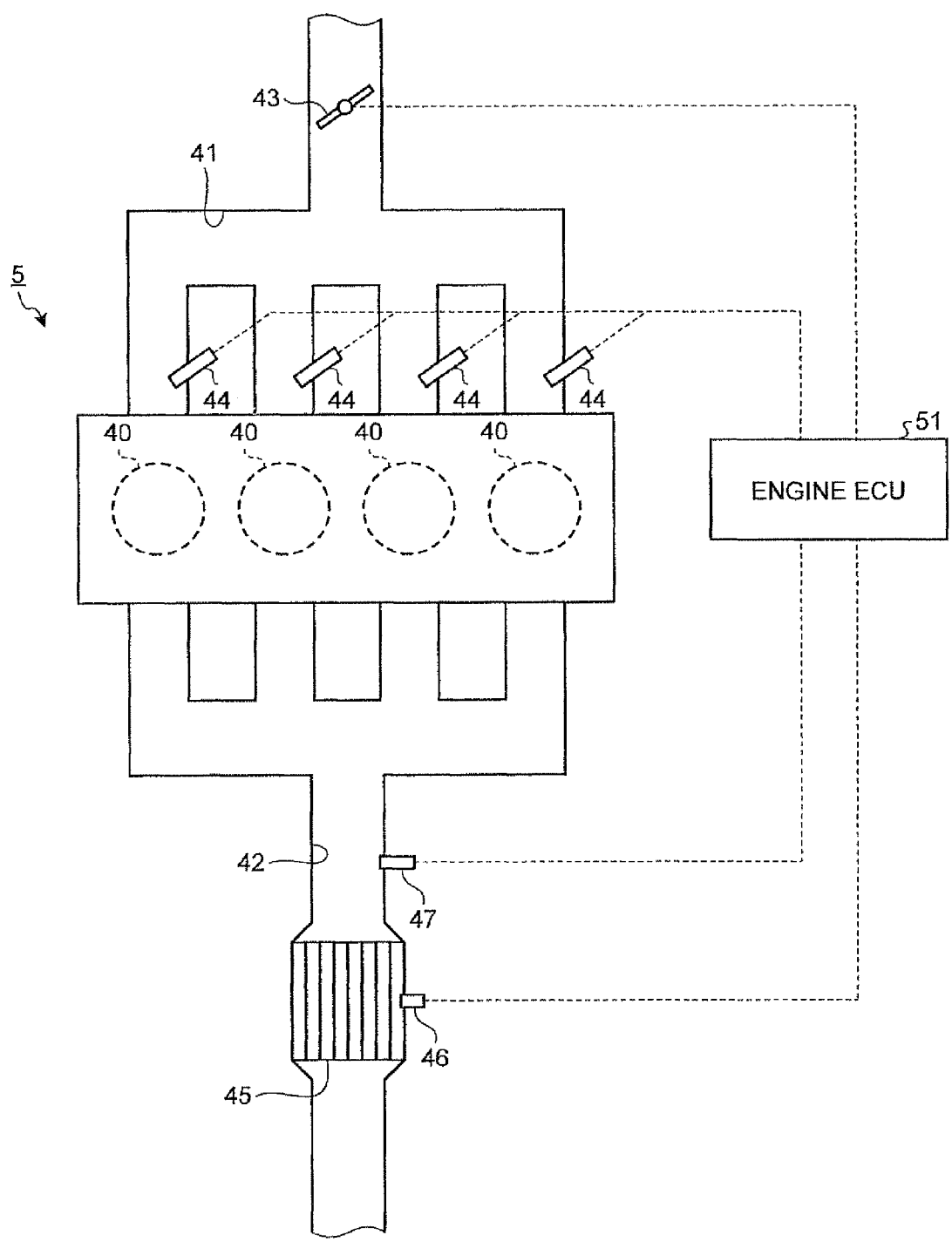
FIG. 2 is a detailed view of an engine shown in FIG. 1.

FIG. 2 is a detail view of the engine shown in FIG. 1. Since the engine 5 is an internal combustion engine that can be operated by combusting a fuel in a combustion chamber, the engine 5 is connected to a suction air path 41 as an air path when air for combusting the fuel is sucked and to an exhaust air path 42 of an exhaust gas exhausted after the fuel is combusted. Among them, the suction air path 41 is disposed with a throttle valve 43 as a intake air amount adjusting means that adjusts an amount of air to be sucked by the engine 5 and a fuel injector 44 as a fuel supplying means that injects the fuel into a combustion chamber 40. Further, the exhaust air path 42 is disposed with a catalyst 45 as a purifying means that purifies the exhaust gas that flows in the exhaust air path 42. Further, the exhaust air path 42 is disposed with a catalyst temperature sensor 46 as a catalyst temperature detecting means for detecting a temperature of the catalyst 45 and an air-fuel ratio sensor 47 as an air-fuel ratio detecting means for detecting an air-fuel ratio of the exhaust gas that flows in the exhaust air path 42. The throttle valve 43, the fuel injector 44, the catalyst temperature sensor 46, and the air-fuel ratio sensor 47 are connected to the engine ECU 51.

Figure 3:
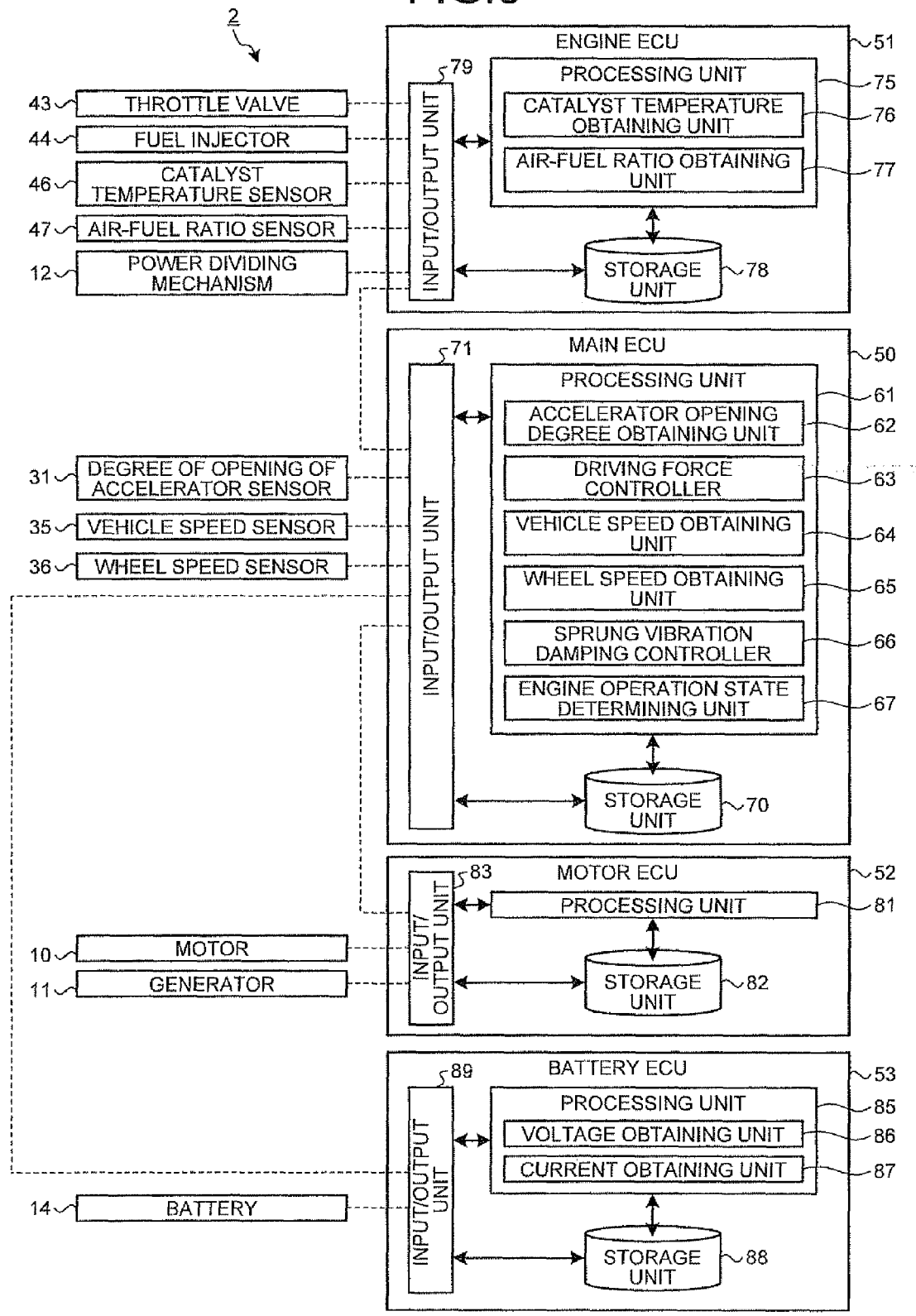
FIG. 3 is a main portion configuration view of the vibration-damping controlling apparatus shown in FIG. 1.

FIG. 3 is a main portion configuration view of the vibration-damping controlling apparatus shown in FIG. 1. The engine ECU 51, the motor ECU 52, and the battery ECU 53 are connected to the main ECU 50. Among them, first, the main ECU 50 will be explained. The main ECU 50 is disposed with a processing unit 61, a storage unit 70, and an input/output unit 71 which are connected to each other and can deliver a signal. Further, the engine ECU 51, the motor ECU 52, and the battery ECU 53, which are connected to the main ECU 50, are connected to the input/output unit 71 which inputs and outputs a signal between the engine ECU 51 and the like. Further, the storage unit 70 stores therein a computer program for controlling the vibration-damping controlling apparatus 2 according to the first embodiment. The storage unit 70 may be configured of a hard disk device and an optical magnetic disk device, a non-volatile memory such as a flash memory (a read-only storage medium such as CD-ROM), a volatile memory such as Random Access Memory (RAM), or a combination of these memory devices.

Further, the processing unit 61 is configured of a memory and a Central Processing Unit (CPU) and includes a accelerator opening degree obtaining unit 62 as an accelerator operation obtaining means that can obtain a degree of opening of accelerator from a result of detection in the accelerator opening degree sensor 31, a driving force controller 63 as a driving force controlling means that can control the driving force generated by the outputs of the engine 5 and the motor 10 by controlling the engine 5 and the motor 10 and the power dividing mechanism 12, a vehicle speed obtaining unit 64 as vehicle speed obtaining means that can obtain a vehicle speed by a result of detection in the vehicle speed sensor 35, a wheel speed obtaining unit 65 as a wheel speed obtaining means that can obtain the wheel speeds of the respective wheels 20 by a result of detection in the wheel speed sensor 36, an sprung vibration damping controller 66 as a sprung vibration damping controlling means that executes a sprung vibration damping control as a control for suppressing sprung vibration by controlling a driving force when the vehicle 1 travels, and an engine operation state determining unit 67 as an engine operation state determining means that determines the operation state of the engine 5.

Further, a basic configuration of the engine ECU 51 is the same as the configuration of the main ECU 50, the engine ECU 51 includes a processing unit 75, a storage unit 78, and an input/output unit 79 likewise the main ECU 50. The processing unit 75, the storage unit 78, and the input/output unit 79 are connected to each other and can deliver a signal to each other. Further, the throttle valve 43, the fuel injector 44, the catalyst temperature sensor 46, the air-fuel ratio sensor 47, and the power dividing mechanism 12, which are connected to the engine ECU 51 are connected to the input/output unit 79, and the input/output unit 79 inputs and outputs a signal between the throttle valve 43, the catalyst temperature sensor 46 and the like. Further, the storage unit 78 stores therein a computer program that controls the vibration-damping controlling apparatus 2 according to the first embodiment likewise the storage unit 70 of the main ECU 50.

Further, the processing unit 75 is configured of a memory and a CPU and includes a catalyst temperature obtaining unit 76 as a catalyst temperature obtaining means that can obtain a temperature of the catalyst 45 by a result of detection in the catalyst temperature sensor 46 and an air-fuel ratio obtaining unit 77 as an air-fuel ratio obtaining means that can detect an air-fuel ratio of an air fuel mixture of air and fuel when the engine 5 is operated by a result of detection in the air-fuel ratio sensor 47.

Further, a basic configuration of the motor ECU 52 is the same configuration as the main ECU 50 and the engine ECU 51, and the motor ECU 52 includes a processing unit 81, a storage unit 82, and an input/output unit 83 likewise the main ECU 50 and the like. The processing unit 81, the storage unit 82, and the input/output unit 83 are connected to each other and can deliver a signal to each other. Further, the motor 10 and the generator 11, which are connected to the motor ECU 52, are connected to the input/output unit 83, and the input/output unit 83 inputs and outputs a signal between the motor 10 and the generator 11.

Further, a basic configuration of the battery ECU 53 is the same configuration as the main ECU 50 and the like, and the battery ECU 53 includes a processing unit 85, a storage unit 88, and an input/output unit 89 likewise the main ECU 50 and the like. The processing unit 85, the storage unit 88, and the input/output unit 89 are connected to each other and can deliver a signal to each other. Further, the battery 14, which is connected to the battery ECU 53, is connected to the input/output unit 89 which inputs and outputs a signal between the input/output unit 89 and the battery 14.

Further, the processing unit 85 is configured of a memory and a CPU and includes a voltage obtaining unit 86 as a battery voltage obtaining means that obtains a voltage of the power charged in the battery 14 and a current obtaining unit 87 as a battery current obtaining means that obtains a current of the power charged in the battery 14.

The vibration-damping controlling apparatus 2, which is controlled by the main ECU 50, the engine ECU 51, the motor ECU 52, and the battery ECU 53, is controlled by that the processing unit 61 of the main ECU 50 reads the computer program to a memory assembled to the processing unit 61 and executes an arithmetic operation based on, for example, results of detection in the accelerator opening degree sensor 31 and in the wheel speed sensor 36 and operates the engine 5 and the motor 10 via the engine ECU 51 and the motor ECU 52 in response to a result of the arithmetic operation. At the time, the processing unit 61 appropriately stores a numerical value in a halfway of the arithmetic operation in the storage unit 70 or fetches the stored numerical value, thereby execute the arithmetic operation. Note that when the vibration-damping controlling apparatus 2 is controlled as described above, the vibration-damping controlling apparatus 2 may be controlled by dedicated hardware different from the main ECU 50, the engine ECU 51, the motor ECU 52, the battery ECU 53 in place of the computer program.

The vibration-damping controlling apparatus 2 according to the first embodiment is configured as described above, and an operation of the vibration-damping controlling apparatus 2 will be explained below. The vehicle 1, to which the vibration-damping controlling apparatus 2 according to the first embodiment is disposed, adjusts a vehicle speed by adjusting the outputs of the engine 5 and the motor 10 when the vehicle 1 travels and by transmitting the outputs to the front wheels 21 as the driving wheels. That is, while the vehicle 1 travels, the output of the engine 5 is appropriately divided and transmitted by the power dividing mechanism 12 in a direction of the generator 11 and in a direction of the speed reducer 15 in response to a traveling state of the vehicle 1 and further the output of the motor 10 is transmitted to the speed reducer 15. After the speeds of the outputs transmitted to the speed reducer 15 are reduced by the speed reducer 15, the reduced outputs are transmitted to the front wheels 21. With the operation, the front wheels 21 are rotated and the vehicle 1 travels.

Further, the vehicle speed of the vehicle 1, which is caused to travel by transmitting the outputs of the engine 5 and the motor 10 to the front wheels 21, is adjusted by operating the accelerator pedal 30, which is disposed in an interior of the vehicle 1, with foot. When the driver operates the accelerator pedal 30 as described above, an amount of stroke, that is, the degree of opening of accelerator of the accelerator pedal 30 is detected by the accelerator opening degree sensor 31 disposed in the vicinity of the accelerator pedal 30. A result of detection detected by the accelerator opening degree sensor 31 is transmitted to the accelerator opening degree obtaining unit 62 provided with the processing unit 61 of the main ECU 50 and obtained by the accelerator opening degree obtaining unit 62. The degree of opening of accelerator obtained by the accelerator opening degree obtaining unit 62 is transmitted to the driving force controller 63 provided with the processing unit 61 of the main ECU 50.

Further, when the outputs of the engine 5 and the motor 10 are transmitted at the time the vehicle 1 travels, the vehicle speed is detected by the vehicle speed sensor 35 disposed to the speed reducer 15 that reduces the outputs and transmits the reduced output to the front wheels 21. The vehicle speed detected by the vehicle speed sensor 35 is transmitted to the vehicle speed obtaining unit 64 provided with the processing unit 61 of the main ECU 50 and obtained by the vehicle speed obtaining unit 64. The vehicle speed obtained by the vehicle speed obtaining unit 64 is transmitted to the driving force controller 63 likewise the degree of opening of accelerator obtained by the accelerator opening degree obtaining unit 62.

The driving force controller 63, to which the degree of opening of accelerator and the vehicle speed are transmitted, derives an output generated by the engine 5 and an output generated by the motor 10 based on the degree of opening of accelerator and the vehicle speed and further on the other result of detection which is used in the other control when the vehicle 1 travels and shows a state when the vehicle 1 travels. That is, the driving force controller 63 derives the required driving force required by the driver in response to the degree of opening of accelerator, the vehicle speed, and the like and derives the outputs of the engine 5 and the motor 10, which can generate the required driving force, from a present traveling state.

Note that the required driving force includes not only a driving force in acceleration but also a deceleration force, that is, a driving force in a minus direction when it is assumed that the driving force in acceleration is a plus direction, and the output of the motor 10 includes also an output when the regenerative brake is applied in deceleration. The driving force controller 63, which derives the outputs of the engine 5 and the motor 10, transmits the derived outputs to the engine ECU 51 and the motor ECU 52. That is, the output of the engine 5 derived by the driving force controller 63 is transmitted from the driving force controller 63 to the engine ECU 51, and the output of the motor 10 derived by the driving force controller 63 is transmitted from the driving force controller 63 to the motor ECU 52.

Among them, the engine ECU 51, to which the output of the engine 5 is transmitted, controls the engine 5 so that the transmitted output is generated by the engine 5. Specifically, the engine ECU 51 obtains a result of detection in the catalyst temperature sensor 46 disposed to the exhaust air path 42 by the catalyst temperature obtaining unit 76 provided with the processing unit 75 and obtains a result of detection in the air-fuel ratio sensor 47 by the air-fuel ratio obtaining unit 77 provided with the processing unit 75, thereby adjusting a degree of opening of the throttle valve 43 disposed to the suction air path 41 and an injection amount of fuel injected by the fuel injector 44 and the like while obtaining the operation state of the engine 5. Thus, the engine 5 is controlled so that the output of the engine 5 becomes the output transmitted from the driving force controller 63. With the operation, while the engine 5 is operated, the exhaust gas after combustion in the combustion chamber 40 flows to the exhaust air path 42, and the exhaust gas that flows in the exhaust air path 42 is emitted to the atmosphere after the exhaust gas is purified by the catalyst 45 disposed to the exhaust air path 42 and then the sound volume thereof is reduced by a silencer (illustration omitted). Further, the motor ECU 52, to which the output of the motor 10 is transmitted, controls the motor 10 so that the motor 10 generates the output transmitted thereto.

Further, the driving force controller 63 controls the output transmitted from the engine 5 to the speed reducer 15 by controlling the power dividing mechanism 12. The output, which is generated by the engine 5, is divided by the power dividing mechanism 12 controlled by the driving force controller 63 in the directions of the speed reducer 15 and the generator 11, thereby transmitting a desired output to the speed reducer 15, and transmitting the output generated by the motor 10 from the motor 10 to the speed reducer 15. As described above, the outputs of the engine 5 and the motor 10 controlled by the engine ECU 51 and the motor ECU 52 are transmitted to the speed reducer 15 and further transmitted from the speed reducer 15 to the front wheels 21 so that the vehicle 1 travels.

Further, when the engine 5 and the motor 10 cause the vehicle 1 to travel through the outputs thereof as described above, the engine 5 and the motor 10 are disposed so that the vehicle 1 can be caused to travel not only through the output obtained by combining the output of the engine 5 and the motor 10 but also through the output of any one of the engine 5 and the motor 10. In the case, the operation of a power source on a side where the output thereof is not used as the driving force can be halted. Accordingly, the engine 5 executes a so-called intermittent operation in which the engine 5 is operated or stopped in response to a traveling state of the vehicle 1.

Further, the vehicle 1 executes the sprung vibration damping control that is a control for suppressing the sprung vibration generated while the vehicle 1 travels. The sprung vibration damping control is executed by a known control method by controlling the driving force of the vehicle 1 in travel. An outline of an example of the sprung vibration damping control will be explained. The wheel speeds of the respective wheels 20 detected by the wheel speed sensor 36 is obtained by the wheel speed obtaining unit 65 provided with the processing unit 61 of the main ECU 50, and the obtained wheel speeds are transmitted to the sprung vibration damping controller 66 provided with the processing unit 61 of the main ECU 50. Further, the required driving force derived by the driving force controller 63 based on the degree of opening of accelerator and the like is transmitted to the sprung vibration damping controller 66.

The sprung vibration damping controller 66 calculates required torque that is wheel torque when the required driving force is generated from the required driving force transmitted from the driving force controller 63 and calculates estimated torque that is actual wheel torque including also an disturbance from the wheel speeds transmitted from the wheel speed obtaining unit 65. The sprung vibration damping controller 66 estimates the motion state of the vehicle 1 based on a difference between the calculated required torque and the estimated torque calculated as described above, thereby estimating the sprung vibration of the vehicle 1. Further, the sprung vibration damping controller 66 calculates a correction value of the driving force for suppressing the thus estimated sprung vibration and transmits the calculated correction value to the driving force controller 63.

The driving force controller 63 corrects a control amount of the motor 10 by the correction value transmitted from the sprung vibration damping controller 66 and transmits the corrected control amount to the motor ECU 52. The motor ECU 52 controls the motor 10 by the corrected control amount. That is, although the motor 10 generates drive torque in acceleration and generates regenerative torque in deceleration, the driving force controller 63 corrects the drive torque and the regenerative torque by the correction value transmitted from the sprung vibration damping controller 66. The actual wheel torque, which is generated by transmitting the torque of the motor 10 controlled by the corrected control amount becomes torque that can suppress the sprung vibration and the sprung vibration is suppressed.

In the sprung vibration damping control, when the torque of the wheels 20 is adjusted, the motor 10 used as described above. However, since the motor 10 is operated by the power of the battery 14 or charges the battery 14 by generating power in regeneration, when the sprung vibration damping control is executed, a consumed amount and a charged amount of the power stored in the battery 14 changes. That is, since the correction value when the sprung vibration damping control is executed is a value based on a difference between the required torque that is torque required by the driver and the estimated torque that is the actually generated torque, the correction value becomes plus or minus to the control amount when the required driving force required by the driver is generated. Therefore, when the vehicle 1 is accelerated, the consumed amount of power when the motor 10 is operated is changed by a change of the control amount of the motor 10, and when the vehicle 1 is decelerated, the charged amount of power, which is regenerated by the motor 10 and charged to the battery 14, is changed by a change of the torque of the motor 10.

Further, the motor 10 is used to start the engine 5 which executes the intermittent operation. That is, when the engine 5 at rest starts, the output generated by the motor 10 is partly transmitted to the engine 5 via the speed reducer 15 and the power dividing mechanism 12, thereby rotating a crank shaft (illustration is omitted) as a rotating shaft of the engine 5 and starting the engine 5. When the engine 5 starts as described above, the engine 5 is started by operating the motor 10 by adding the power, which is necessary to rotate the crank shaft and to start the engine 5, to the control amount of the motor 10. Therefore, when the engine 5 starts, the consumed amount of power of the battery 14 is also increased as the output of the motor 10 is increased.

Further, when the vehicle 1 is decelerated, regenerative torque is generated by the motor 10 and an engine brake, which is a resistance generated by closing the throttle valve 43 of the engine 5, is generated. However, when the engine 5 stops, since the engine brake is not applied, the regenerative torque of the motor 10 is increased to compensate a decelerating force generated by the engine brake by the motor 10 and thus the charged amount of the battery 14 is increased. That is, when the engine 5 in operation stops, since the engine 5 does not contribute to a travel of the vehicle 1, the power dividing mechanism 12 does not transmit the power of the engine 5 to the driving wheels. Therefore, when the engine 5 is stopped in the process of deceleration of the vehicle 1 and the power of the engine 5 is not transmitted to the driving wheels, the engine brake is not generated. Therefore, when the engine 5 is stopped at the time the vehicle 1 is decelerated, since the engine brake is not applied, a regeneration amount is abruptly increased because the regenerative torque generated by the motor 10 is abruptly increased, and thus the charged amount from the motor 10 to the battery 14 is abruptly increased.

As described above, when the sprung vibration damping control is executed and when the engine 5 starts and stops, although the consumed amount and the charged amount of the power of the battery 14 are changed together, when the voltage of the charged power excessively increases or decreases, the battery 14 is liable to be deteriorated. When the battery 14 is deteriorated, since the motor 10 is unlike to generate an output, a reduced amount of the output of the motor 10 is compensated by the output of the engine 5. Therefore, a fuel consumption may be deteriorated or an amount of exhaust gas may be increased, and further since the output of the motor 10 is lowered, a traveling performance may be deteriorated. Therefore, the vibration-damping controlling apparatus 2 according to the first embodiment does not execute the sprung vibration damping control and the start and stop of the engine 5 at the same time to suppress the deterioration of the battery 14, and, more specifically, when the engine 5 starts and stops, the sprung vibration damping control is not executed.

Figure 4:
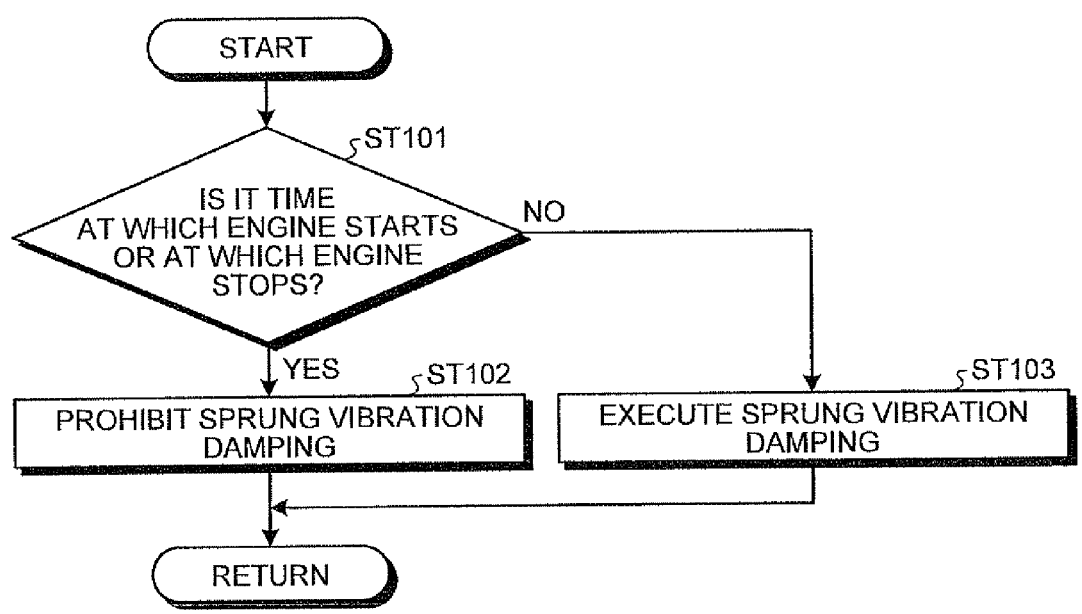
FIG. 4 is a flowchart showing a processing procedure of the vibration-damping controlling apparatus according to the first embodiment.

FIG. 4 is a flowchart showing a processing procedure of a vibration-damping controlling apparatus according to the first embodiment. Next, a control method by the vibration-damping controlling apparatus 2 according to the first embodiment, that is, the processing procedure by the vibration-damping controlling apparatus 2 will be explained. In processing procedure by the vibration-damping controlling apparatus 2 according to the first embodiment, first, whether it is a time at which an engine starts or the engine stops is determined (step ST101). The determination is executed by an engine operation state determining unit 67 provided with a processing unit 61 of a main ECU 50. The engine operation state determining unit 67 receives a control signal when the engine 5 is controlled from an engine ECU 51 that controls the engine 5, thereby determining whether it is the time at which the engine starts or the engine stops.

When it is determined by the determination in the engine operation state determining unit 67 (step ST101) that it is the time at which the engine starts or the engine is stops, the sprung vibration damping control is prohibited (step ST102). The sprung vibration damping control is prohibited by an sprung vibration damping controller 66. When the engine operation state determining unit 67 determines that it is the time at which the engine 5 starts or stops even when the sprung vibration is generated, the sprung vibration damping controller 66 prohibits the sprung vibration damping control. When the sprung vibration damping control is prohibited by the sprung vibration damping controller 66, a process passes through the processing procedure.

In contrast, when it is determined by the determination (step ST101) in the engine operation state determining unit 67 that it is not the time at which the engine starts and the engine stops, the sprung vibration damping control is executed (step ST103). That is, in a case other than that the engine starts and the engine stops, when the sprung vibration is generated to the vehicle 1, the sprung vibration damping controller 66 executes the sprung vibration damping in response to the sprung vibration.

Although the vibration-damping controlling apparatus 2 is disposed to execute the sprung vibration damping by controlling the torque of the motor 10, since the sprung vibration damping is prohibited at the time when the engine 5 starts or stops, it can be suppressed that a voltage of the power charged to a battery 14 excessively increases or decreases. Therefore, since the deterioration of the battery 14 can be suppressed and an output performance of the motor 10 can be kept, a traveling performance can be secured. Further, the other control, which is executed using the power of the battery 14 can be more reliably executed by suppressing the deterioration of the battery 14. As a result, it can be suppressed that the other control is under the influence of the execution of the sprung vibration damping control.

Second Embodiment

Figure 5:
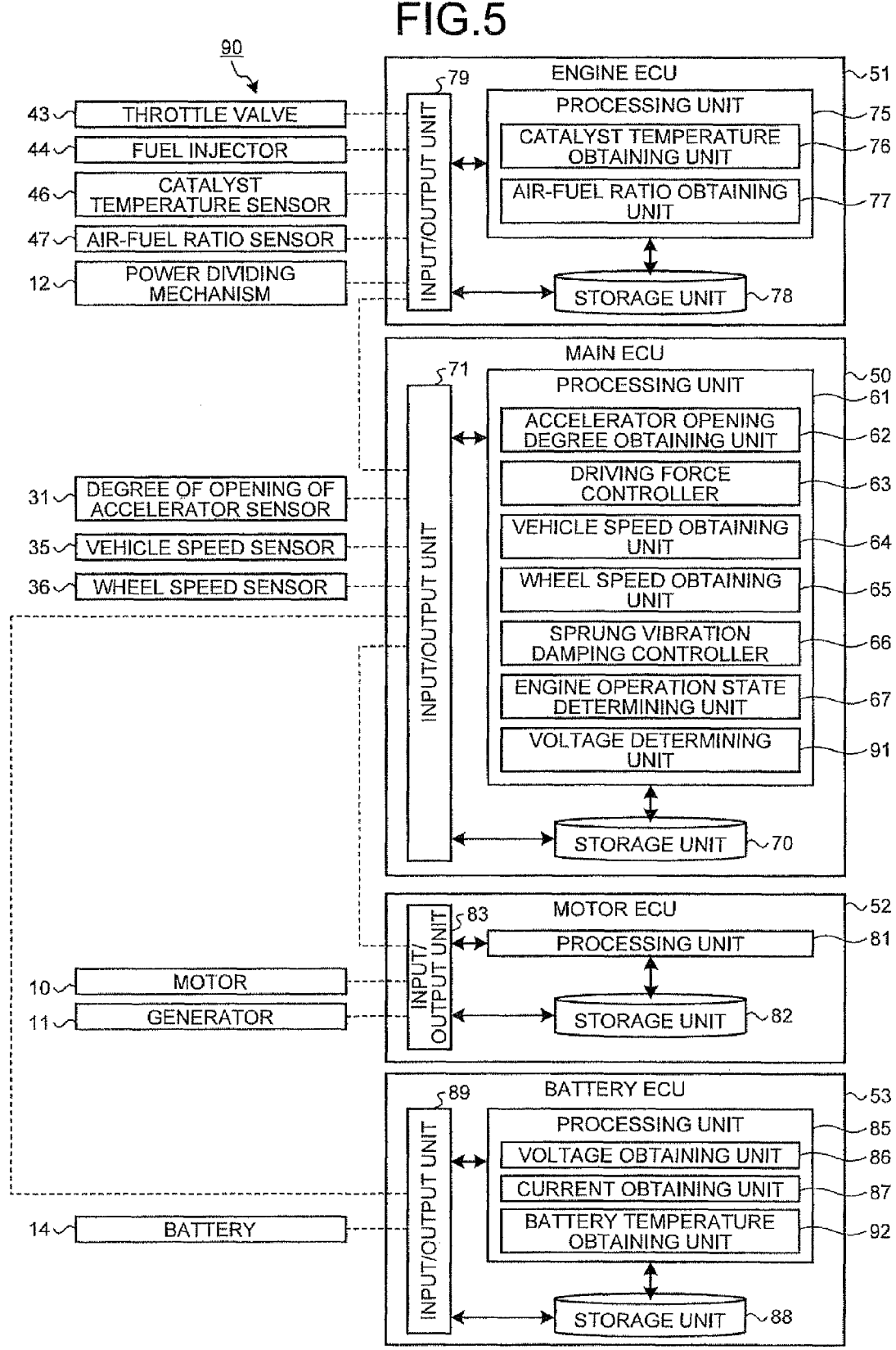
FIG. 5 is a main portion configuration view of a vibration-damping controlling apparatus according to a second embodiment.

Although a vibration-damping controlling apparatus 90 according to a second embodiment has approximately the same configuration as the vibration-damping controlling apparatus 2 according to the first embodiment, the vibration-damping controlling apparatus 90 has a feature in that a voltage of a battery 14 is included as an execution condition of the sprung vibration damping control. Since the other configuration is the same as the first embodiment, explanation of the other configuration is omitted as well as the same reference numerals are attached. FIG. 5 is a main portion configuration view of the vibration-damping controlling apparatus according to the second embodiment. In the vibration-damping controlling apparatus 90 according to the second embodiment, whether or not it is a time at which an engine 5 starts or stops is used when whether or not the sprung vibration damping control is prohibited is determined likewise the vibration-damping controlling apparatus 2 according to the first embodiment, and, in the vibration-damping controlling apparatus 90 according to the second embodiment, a voltage of the battery 14 is also used to determine whether or not the sprung vibration damping control is prohibited.

Therefore, in the vibration-damping controlling apparatus 90 according to the second embodiment, a processing unit 61 of a main ECU 50 further includes a voltage determining unit 91 as a battery voltage determining means that determines whether or not the voltage of the battery 14 is in a predetermined range in addition to a accelerator opening degree obtaining unit 62, a driving force controller 63, a vehicle speed obtaining unit 64, a wheel speed obtaining unit 65, an sprung vibration damping controller 66, and an engine operation state determining unit 67. Further, a processing unit 85 of a battery ECU 53 further includes a battery temperature obtaining unit 92 as a battery temperature obtaining means that obtains a temperature of the battery 14 in addition to a voltage obtaining unit 86 and a current obtaining unit 87.

The vibration-damping controlling apparatus 90 according to the second embodiment is configured as described above, and an operation of the vibration-damping controlling apparatus 90 will be explained below. Whether or not the sprung vibration damping control is prohibited is determined in the vibration-damping controlling apparatus 90 according to the second embodiment, a determination for prohibiting the sprung vibration damping control is executed when it is a time at which an engine 5 starts or stops as well as the voltage of the battery 14 is equal to or more than an upper limit threshold value or equal to or less than a lower limit threshold value.

Figure 6:
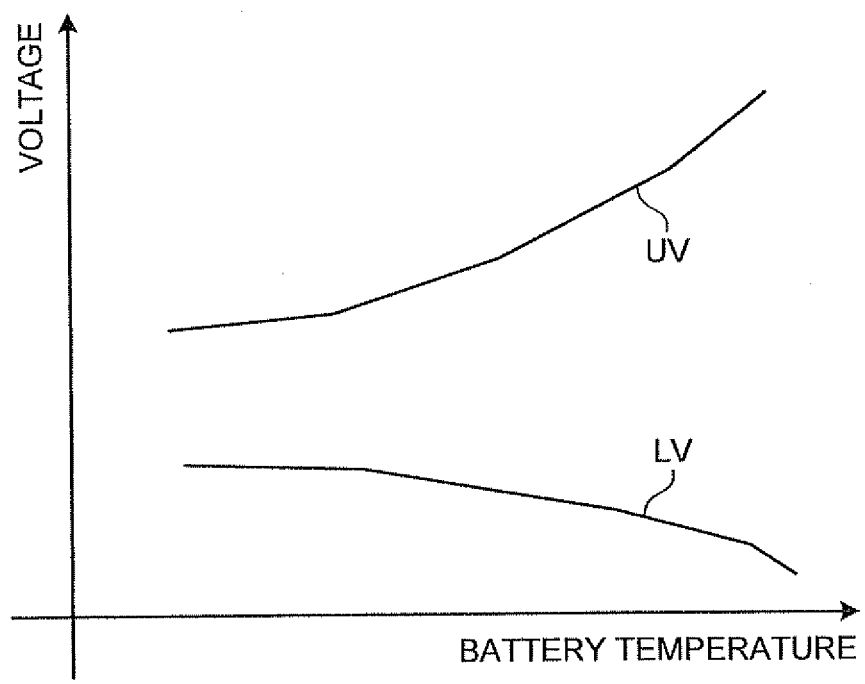
FIG. 6 is an explanatory view showing upper/lower limit threshold values of a voltage to a battery temperature.

FIG. 6 is an explanatory view showing the upper/lower limit threshold values of a voltage to a battery temperature. In the vibration-damping controlling apparatus 90 according to the second embodiment, although the voltage of the battery 14 is used when whether or not the sprung vibration damping control is prohibited is determined, the upper/lower limit values of a voltage in which the battery 14 is liable to be deteriorated are different depending on temperature. That is, since an internal resistance of the battery 14 is increased as a temperature decreases, a width of the upper/lower limit values of the voltage in which the battery 14 is liable to be deteriorated in accordance with a temperature decreases. Therefore, a voltage upper limit value UV, which is the upper limit threshold value of the voltage when whether or not the sprung vibration damping control is prohibited is determined, is reduced as the temperature of the battery 14 decreases as shown in FIG. 6, and a voltage lower limit value LV, which is the lower limit threshold value of the voltage is increased as the temperature of the battery 14 decreases as shown in FIG. 6.

The sprung vibration damping controller 66 prohibits the sprung vibration damping control when the voltage of the battery 14 is not between the voltage upper limit value UV and the voltage lower limit value LV which change in response to temperature. Note that the voltage upper limit value UV and the voltage lower limit value LV are previously set as values which are determined by proving the upper/lower limit values of the voltage, in which the battery 14 is liable to be actually deteriorated, with a margin and stored in a storage unit 70 of the main ECU 50.

Figure 7:
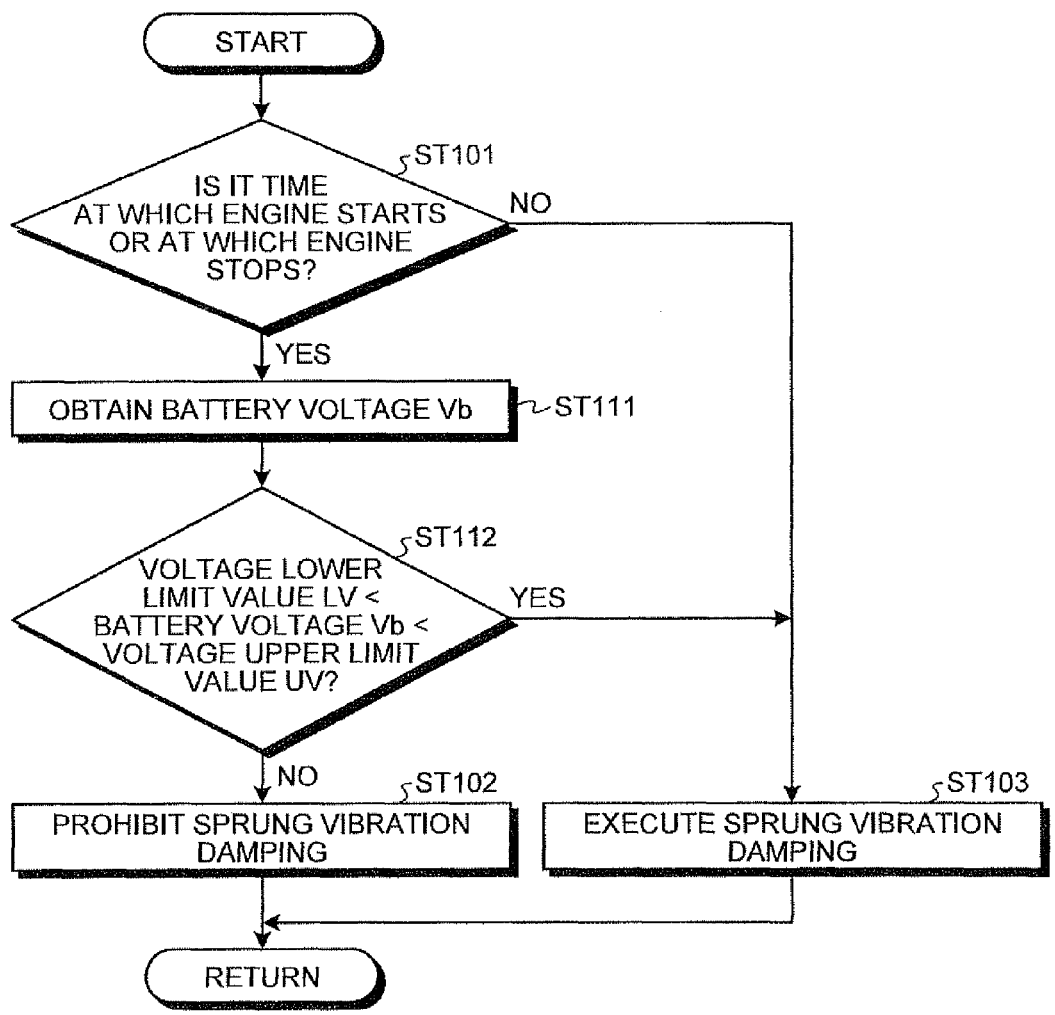
FIG. 7 is a flowchart showing a processing procedure of the vibration-damping controlling apparatus according to the second embodiment.

FIG. 7 is a flowchart showing a processing procedure of a vibration-damping controlling apparatus according to an second embodiment. Next, a control method by the vibration-damping controlling apparatus 90 according to the second embodiment, that is, the processing procedure by the vibration-damping controlling apparatus 90 will be explained. In the processing procedure by the vibration-damping controlling apparatus 90 according to the second embodiment, first, whether it is a time at which an engine starts or the engine stops is determined by an engine operation state determining unit 67 provided with a processing unit 61 of the main ECU 50 (step ST101).

When it is determined that it is the time at which the engine starts or the engine is stops by the determination in the engine operation state determining unit 67 (step ST101), next, a battery voltage Vb is obtained (step ST111). The battery voltage Vb is obtained by a voltage obtaining unit 86 provided with a processing unit 85 of a battery ECU 53.

Next, whether or not voltage lower limit value LV<battery voltage Vb<voltage upper limit value UV is established is determined (step ST112). The determination is executed by a voltage determining unit 91 provided with the processing unit 61 of the main ECU 50, and the voltage determining unit 91 executes the determination by comparing the battery voltage Vb obtained by the voltage obtaining unit 86 with the voltage upper limit value UV and the voltage lower limit value LV stored in a storage unit 70 of the main ECU 50.

More specifically, the voltage upper limit value UV and the voltage lower limit value LV to a temperature of the battery 14 are preset and stored in the storage unit 70 of the main ECU 50 as shown in FIG. 6. Further, when the determination is executed by a voltage determining unit 91, the temperature of the battery 14 is further obtained by the battery temperature obtaining unit 92 provided with the processing unit 85 of the battery ECU 53 in addition to the battery voltage Vb. The voltage determining unit 91 calculates the voltage upper limit value UV and the voltage lower limit value LV at a present temperature of the battery 14 by the voltage upper limit value UV and the voltage lower limit value LV to the temperature of the battery 14 stored in the storage unit 70 of the main ECU 50 and by the temperature of the battery 14 obtained by the battery temperature obtaining unit 92 and compares the calculated voltage upper limit value UV and voltage lower limit value LV with the battery voltage Vb obtained by the voltage obtaining unit 86. The voltage determining unit 91 determines whether or not voltage lower limit value LV<battery voltage Vb<voltage upper limit value UV is established by the comparison.

When it is determined that voltage lower limit value LV<battery voltage Vb<voltage upper limit value UV is not established by the determination in the voltage determining unit 91 (step ST112), that is, when it is determined that battery voltage Vb≥voltage upper limit value UV is established or when it is determined battery voltage Vb≤voltage lower limit value LV is established, the sprung vibration damping control is prohibited (step ST102). The sprung vibration damping is prohibited by an sprung vibration damping controller 66 provided with the processing unit 61 of the main ECU 50. When the sprung vibration damping is prohibited by the sprung vibration damping controller 66, a process passes through the processing procedure.

In contrast, when it is determined by the determination (step ST101) in the engine operation state determining unit 67 that it is not the time at which the engine starts and the engine stops, or even when it is the time at which the engine starts and the engine stops, the sprung vibration damping control is executed (step ST103) when it is determined by the determination in the voltage determining unit 91 (step ST112) that voltage lower limit value LV<battery voltage Vb<voltage upper limit value UV is established. That is, even when it is the time at which the engine starts and the engine stops, the sprung vibration damping control is executed by the sprung vibration damping controller 66 in response to the sprung vibration when the battery voltage Vb is between the voltage upper limit value UV and the voltage lower limit value LV.

When it is the time at which the engine 5 starts or stops as well as the voltage of the battery 14 is equal to or more than the voltage upper limit value UV or equal to or less than the voltage lower limit value LV, since the vibration-damping controlling apparatus 90 described above prohibits the sprung vibration damping, the sprung vibration can be suppressed and the deterioration of the battery 14 can be suppressed at the same time more reliably. That is, even when it is determined that it is the time at which the engine 5 starts or stops, the battery 14 is unlike to be deteriorated by an excessively increased or decreased voltage when the voltage of the battery 14 is smaller than the voltage upper limit value UV as well as larger than the voltage lower limit value LV, that is, when the battery voltage Vb is between the voltage upper limit value UV and the voltage lower limit value LV. Therefore, even when it is determined that it is the time at which the engine 5 starts or stops, the sprung vibration damping can be executed while suppressing the deterioration of the battery 14 and a period in which the sprung vibration damping is executed can be increased when the battery voltage Vb is between the voltage upper limit value UV and the voltage lower limit value LV. As a result, the sprung vibration can be more reliably suppressed while suppressing an influence of the execution of the sprung vibration damping control on the other control.

Further, since the voltage upper limit value UV and the voltage lower limit value LV are changed depending on the temperature of the battery 14, whether or not the battery 14 is in a state in which it is liable to be deteriorated can be more accurately determined. That is, since the internal resistance of the battery 14 is changed by temperature, the threshold value of a voltage, in which the battery 14 is deteriorated by the excessively increased or decreased voltage, is different depending on temperature. Therefore, whether or not the battery 14 is in the state in which it is liable to be deteriorated can be more accurately determined by changing the voltage upper limit value UV and the voltage lower limit value LV, which are threshold values when it is determined whether or not the sprung vibration damping is prohibited using the voltage of the battery 14 at the time the engine 5 starts or stops, in response to the temperature of the battery 14. Accordingly, when it is determined that it is the time at which the engine 5 starts or stops, it can be more appropriately determined whether or not the battery 14 is in the state in which it is liable to be deteriorated, and the period in which the sprung vibration damping is executed can be increased by executing the sprung vibration damping control when the battery 14 is in the state in which it is unlike to be deteriorated. As a result, the sprung vibration can be more reliably suppressed while suppressing the influence of the execution of the sprung vibration damping control on the other control.

Note that, in the vibration-damping controlling apparatus 90 described above, when the voltage upper limit value UV and the voltage lower limit value LV are calculated, they are calculated based on the temperature of the battery 14. However, when the temperature of the battery 14 cannot be detected, other temperature may be substituted for the temperature of the battery 14, and, for example, the voltage upper limit value UV and the voltage lower limit value LV may be calculated using temperatures of cooling water of the engine 5 and an inverter 13, a intake air temperature, an external air temperature, and the like as substitutes. Since the temperature of the battery 14 changes depending on also a peripheral environment, even if the temperature of the battery 14 cannot be detected, values near to the voltage upper limit value UV and the voltage lower limit value LV can be calculated by detecting the above temperatures. With the operation, the threshold value of the battery voltage Vb can be easily calculated, and thus a reference when whether or not the sprung vibration damping is prohibited is determined can be more easily set. As a result, the sprung vibration can be more easily suppressed while suppressing the influence of the execution of the sprung vibration damping control on the other control.

Further, when the temperature of the battery 14 cannot be detected, the voltage upper limit value UV and the voltage lower limit value LV may be set to preset constant values. When the voltage upper limit value UV and the voltage lower limit value LV are set to the constant values, since a control for detecting a sensor for detecting the battery 14, a temperature of the battery 14 and further a control for calculating the voltage upper limit value UV and the voltage lower limit value LV based on the temperature of the battery 14 become unnecessary, whether or not the sprung vibration damping is executed can be more easily determined. As a result, the sprung vibration can be more easily suppressed while suppressing the influence of the execution of the sprung vibration damping control on the other control.

Third Embodiment

Figure 8:
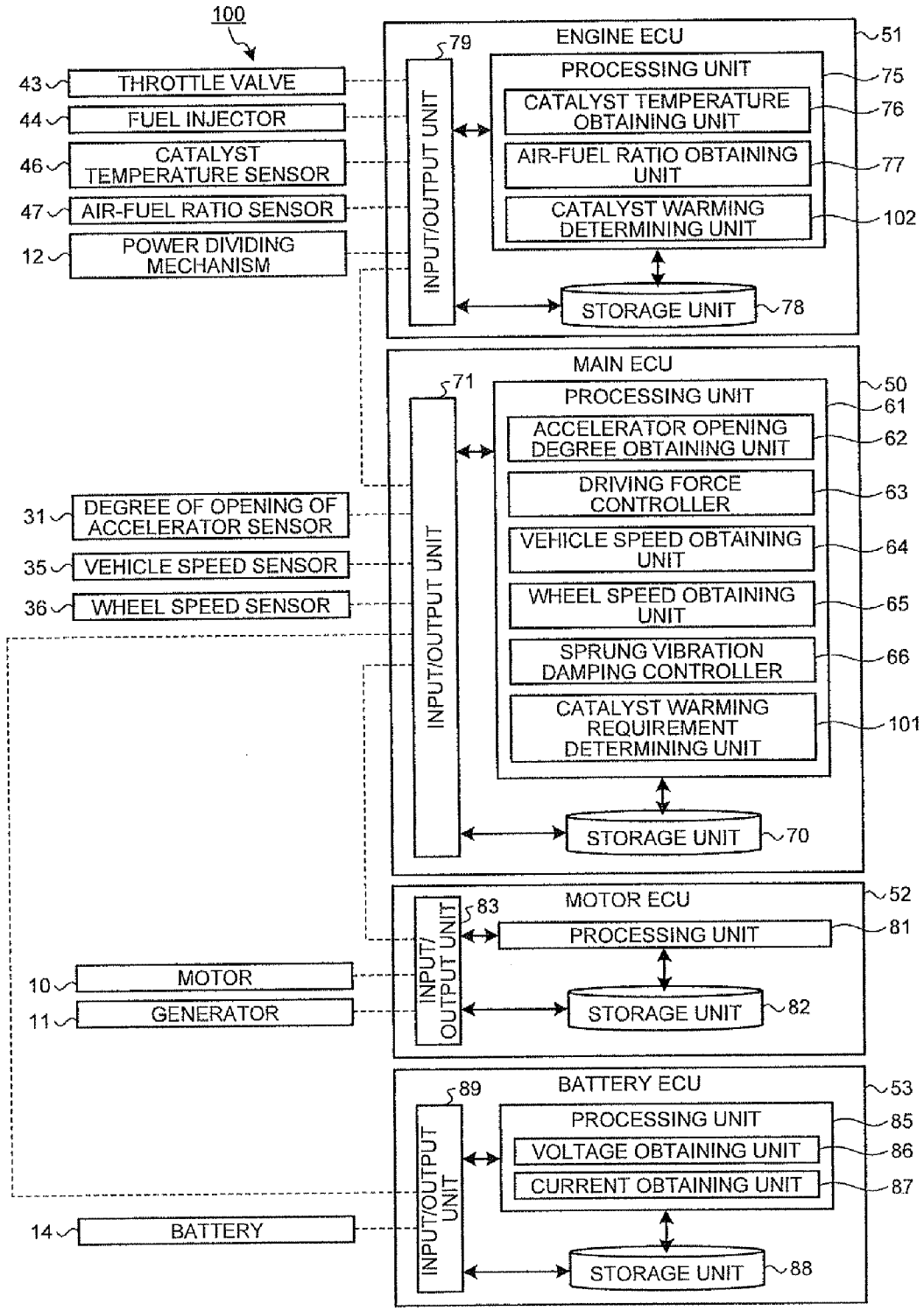
FIG. 8 is a main portion configuration view of a vibration-damping controlling apparatus according to a third embodiment.

Although a vibration-damping controlling apparatus 100 according to a third embodiment has approximately the same configuration as the vibration-damping controlling apparatus 2 according to the first embodiment, the vibration-damping controlling apparatus 100 has a feature in that whether or not the sprung vibration damping is executed is determined based on whether or not a warming requirement of a catalyst 45 is made. Since the other configuration is the same as the first embodiment, explanation of the other configuration is omitted as well as the same reference numerals are attached. FIG. 8 is a main portion configuration view of the vibration-damping controlling apparatus according to the third embodiment. The vibration-damping controlling apparatus 100 according to the third embodiment uses whether or not the warming requirement of the catalyst 45 is made to determine whether or not the sprung vibration damping control is prohibited. Therefore, in the vibration-damping controlling apparatus 100 according to the third embodiment, the processing unit 61 of the main ECU 50 includes the accelerator opening degree obtaining unit 62, the driving force controller 63, the vehicle speed obtaining unit 64, the wheel speed obtaining unit 65, and the sprung vibration damping controller 66 and further includes a catalyst warming requirement determining unit 101 as a catalyst warming requirement determining means that determines whether or not the warming requirement of the catalyst 45 is made from the engine 5. Further, the processing unit 75 of the engine ECU 51 further includes a catalyst warming determining unit 102 as a catalyst warming determining means that determines whether or not the catalyst warming is executed in addition to the catalyst temperature obtaining unit 76 and the air-fuel ratio obtaining unit 77.

The vibration-damping controlling apparatus 100 according to the third embodiment is configured as described above, and an operation of the vibration-damping controlling apparatus 100 will be explained below. When the vibration-damping controlling apparatus 100 according to the third embodiment determines whether or not the sprung vibration damping is prohibited, a determination for prohibiting the sprung vibration damping is made when the warming requirement of the catalyst 45 is made from the engine 5. That is, when the engine 5 is in operation, a result of detection in the catalyst temperature sensor 46, which detects a temperature of the catalyst 45, is obtained by the catalyst temperature obtaining unit 76 provided with the processing unit 75 of the engine ECU 51, and the catalyst warming determining unit 102 provided with the processing unit 75 of the engine ECU 51 determines whether or not the obtained temperature of the catalyst 45 is equal to or less than a threshold value that is used to determine whether or not the catalyst warming is executed. When the catalyst warming determining unit 102 determines that the catalyst warming is executed because the temperature of the catalyst 45 obtained by the catalyst temperature obtaining unit 76 is equal to or less than the threshold value, the engine ECU 51 executes a catalyst warming operation. Note that the threshold value of the temperature of the catalyst 45, which is used to determine whether or not the catalyst warming is executed is previously stored in a storage unit 78 of the engine ECU 51.

When the catalyst warming determining unit 102 executes the catalyst warming operation by determining that the catalyst warming is executed, the temperature of the catalyst 45 is increased in an early stage by increasing the temperature of an exhaust gas by, for example, delaying an ignition timing, and the like. Further, when the ignition timing is delayed to warm the catalyst 45 as described above, the torque of the engine 5 becomes small. Accordingly, when the catalyst warming operation is executed, since the reduced amount of the torque of the engine 5 is compensated by the torque of the motor 10, the torque of the motor 10 is increased in comparison with a case that the catalyst warming operation is not executed and the power consumption of the battery 14 is also increased. Further, since the sprung vibration damping control suppresses the sprung vibration by changing the torque of the motor 10 in response to the sprung vibration, the power consumption of the battery 14 is increased when the sprung vibration damping is executed.

When the engine 5 is in operation, since priority is given to generation of the required driving force of the driver rather than to the catalyst warming operation, the catalyst warming operation is interrupted when the required driving force cannot be generated because the power consumption of the battery 14 becomes excessively large in the process of executing the catalyst warming operation and thus desired torque cannot be generated by the motor 10. In the case, since the temperature of the catalyst 45 becomes a temperature equal to or less than a temperature at which the exhaust gas can be effectively purified, the exhaust gas may not be effectively purified by the catalyst 45. Therefore, in the vibration-damping controlling apparatus 100 according to the third embodiment, when the catalyst warming operation is executed, the torque generated by the motor 10 is secured by prohibiting the sprung vibration damping and reducing the power consumption of the battery 14, thereby continuing the catalyst warming operation.

Figure 9:
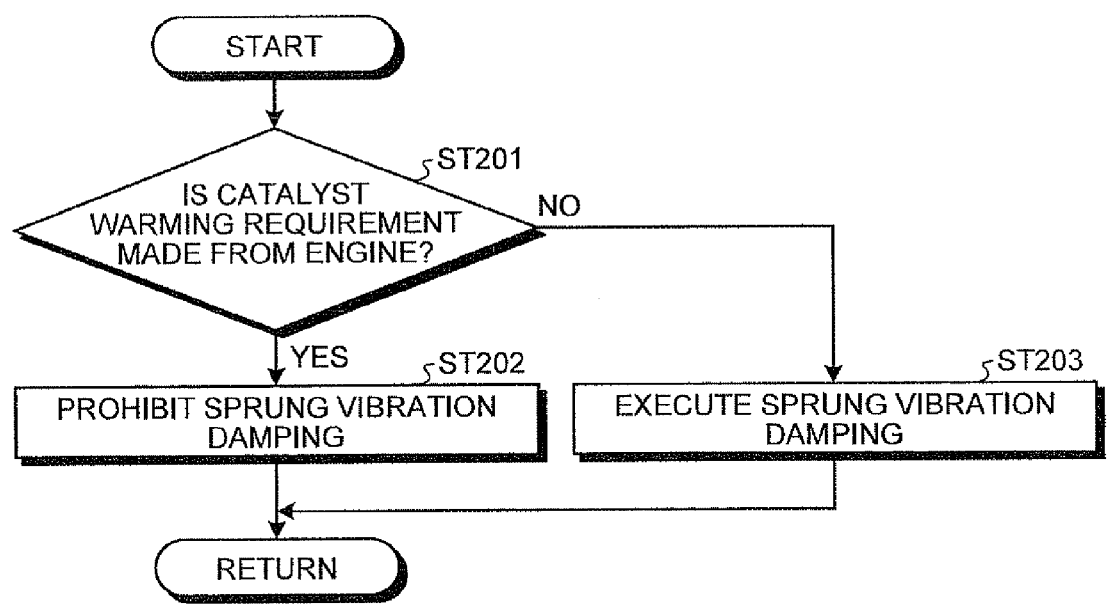
FIG. 9 is a flowchart showing a processing procedure of the vibration-damping controlling apparatus according to the third embodiment.

FIG. 9 is a flowchart showing a processing procedure of the vibration-damping controlling apparatus according to the third embodiment. Next, a control method by the vibration-damping controlling apparatus 100 according to the third embodiment, that is, the processing procedure by the vibration-damping controlling apparatus 100 will be explained. In the processing procedure by the vibration-damping controlling apparatus 100 according to the third embodiment, first, whether or not a catalyst warming requirement is made from the engine 5 is determined (step ST201). The determination is executed by the catalyst warming requirement determining unit 101 provided with the processing unit 61 of the main ECU 50. The warming operation of the catalyst 45 is executed when the catalyst warming determining unit 102 provided with the processing unit 75 of the engine ECU 51 determines that the temperature of the catalyst 45 detected by the catalyst temperature sensor 46 is equal to or less than a predetermined threshold value. Since the warming operation of the catalyst 45 is executed based on the determination in the catalyst warming determining unit 102 as described above, the catalyst warming requirement determining unit 101 determines whether or not the catalyst warming requirement is made based on the determining in the catalyst warming determining unit 102.

That is, when the catalyst warming determining unit 102 determines that the temperature of the catalyst 45 is equal to or less than the predetermined threshold value, since the warming operation of the catalyst 45 is executed, the catalyst warming requirement determining unit 101 determines that the catalyst warming requirement is made from the engine 5 in this case. In contrast, when the catalyst warming determining unit 102 determines that the temperature of the catalyst 45 is higher than the predetermined threshold value, since the warming operation of the catalyst 45 is not executed, the catalyst warming requirement determining unit 101 determines that the catalyst warming requirement is not made from the engine 5 in this case.

When it is determined that the catalyst warming requirement is made from the engine 5 by the determination in the catalyst warming requirement determining unit 101 (step ST201), the sprung vibration damping is prohibited (step ST202). The sprung vibration damping is prohibited by the sprung vibration damping controller 66 provided with the processing unit 61 of the main ECU 50. When the sprung vibration damping is prohibited by the sprung vibration damping controller 66, a process passes through the processing procedure.

In contrast, when it is determined by the determination in the catalyst warming requirement determining unit 101 (step ST201) that the catalyst warming requirement is not made from the engine 5, the sprung vibration damping is executed (step ST203). That is, when the sprung vibration is generated to the vehicle 1 at the time the catalyst warming requirement is not made from the engine 5, the sprung vibration damping controller 66 executes the sprung vibration damping in response to the sprung vibration.

When the catalyst warming requirement is made from the engine 5, since the vibration-damping controlling apparatus 100 described above prohibits the sprung vibration damping, the warming operation of the catalyst 45 can be continued. That is, when the warming operation of the catalyst 45 is executed, the power consumption of the battery 14 is also increased because the torque of the motor 10 is increased to compensate the torque of the engine 5 which is reduced by warming operation. However, when the catalyst warming requirement is made from the engine 5, the power consumption of the battery 14 can be reduced by prohibiting the sprung vibration damping. With the operation, the warming operation of the catalyst 45 can be continued and a purifying performance of the exhaust gas can be more reliably secured. As a result, it can be more reliably suppressed that the other control is under the influence of the execution of the sprung vibration damping control.

Fourth Embodiment

Figure 10:
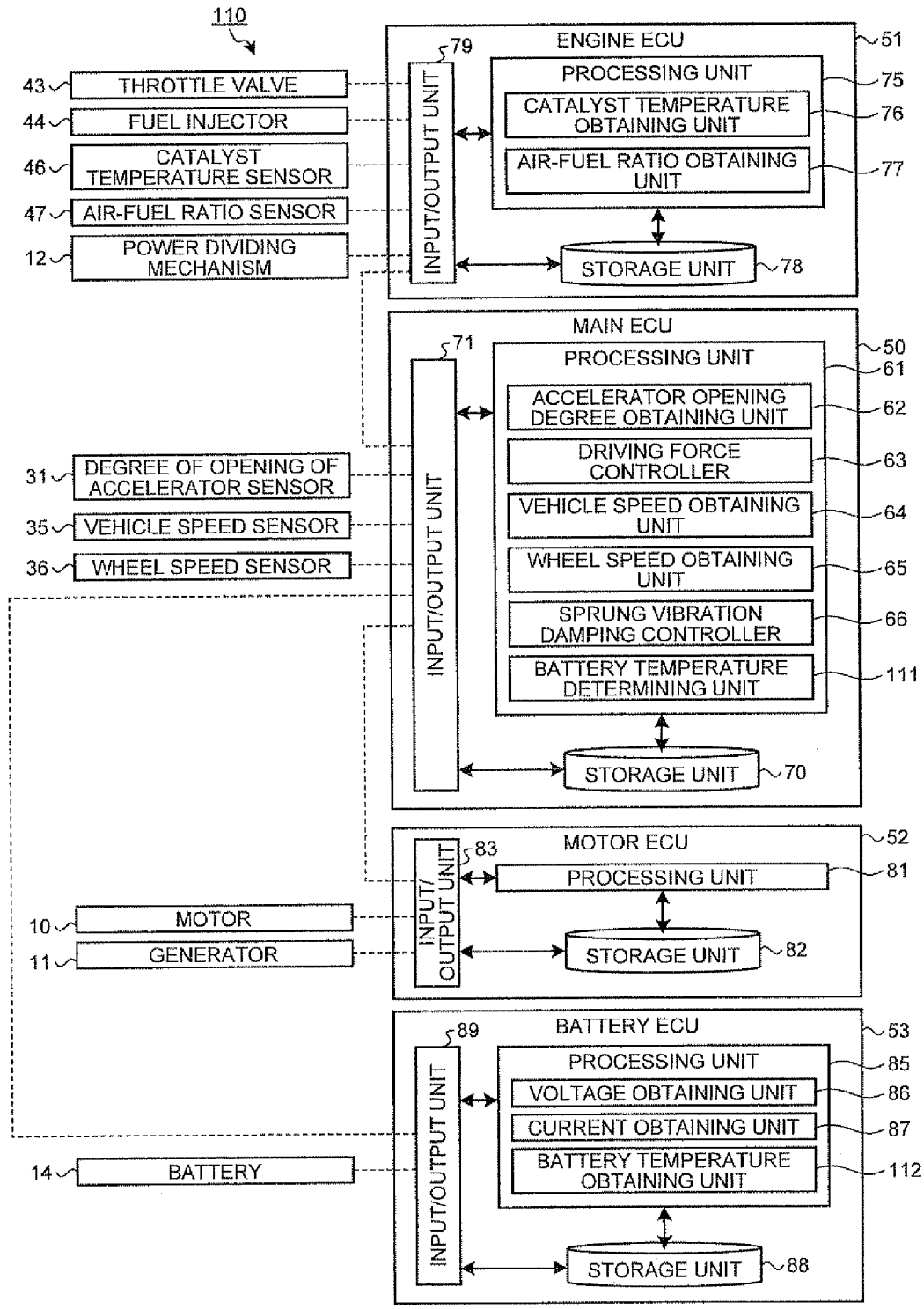
FIG. 10 is a main portion configuration view of a vibration-damping controlling apparatus according to a fourth embodiment.

Although a vibration-damping controlling apparatus 110 according to a fourth embodiment has approximately the same configuration as the vibration-damping controlling apparatus 2 according to the first embodiment, the vibration-damping controlling apparatus 110 has a feature in that whether or not the sprung vibration damping is executed is determined based on the temperature of the battery 14. Since the other configuration is the same as the first embodiment, explanation of the other configuration is omitted as well as the same reference numerals are attached. FIG. 10 is a main portion configuration view of the vibration-damping controlling apparatus according to the fourth embodiment. The vibration-damping controlling apparatus 110 according to the fourth embodiment uses the temperature of the battery 14 to determine whether or not the sprung vibration damping control is prohibited. Therefore, in the vibration-damping controlling apparatus 110 according to the fourth embodiment, the processing unit 61 of the main ECU 50 further includes a battery temperature determining unit 111 as a battery temperature determining means that determines whether or not the temperature of the battery 14 is within a predetermined range in addition to the accelerator opening degree obtaining unit 62, the driving force controller 63, the vehicle speed obtaining unit 64, the wheel speed obtaining unit 65, and the sprung vibration damping controller 66. Further, the processing unit 85 of the battery ECU 53 further includes a battery temperature obtaining unit 112 as a battery temperature obtaining means that obtains the temperature of the battery 14 in addition to a voltage obtaining unit 86 and the current obtaining unit 87.

The vibration-damping controlling apparatus 110 according to the fourth embodiment is configured as described above, and an operation of the vibration-damping controlling apparatus 110 will be explained below. When the vibration-damping controlling apparatus 110 according to the fourth embodiment determines whether or not the sprung vibration damping is prohibited, the vibration-damping controlling apparatus 110 determines that the sprung vibration damping is prohibited when the temperature of the battery 14 is equal to or more than an upper limit threshold value or equal to or less than a lower limit threshold value. That is, when the battery 14 is used in a state that a temperature is excessively high or excessively low, the battery 14 is liable to be deteriorated.

When, for example, an explanation is made as to a case in which a lithium-ion battery is used as an example of the battery 14, a use of the battery 14 in a state that the temperature of the battery 14 excessively low precipitates Li (lithium) metal by which the battery 14 is deteriorated or when a current is used at a high rate, the battery 14 is liable to be deteriorated. Further, when the battery 14 is used in a state that the temperature of the battery 14 is excessively high, the battery 14 is liable to be acceleratingly worn and deteriorated by being charged and discharged.

As described above, when the battery 14 is used in a state that the temperature is excessively high or excessively low, the battery 14 is liable to be deteriorated. When the battery 14 is deteriorated, since the motor 10 is unlike to generate an output, an amount of decrease of the output of the motor 10 is compensated by the output of the engine 5. In the case, a fuel consumption may be deteriorated or an amount of the exhaust gas may be increased. Further, the decrease of the output of the motor 10 may deteriorate the traveling performance.

Therefore, when the temperature of the battery 14 is equal to or less than a lower limit temperature $\alpha$, which is the lower limit threshold value, and is equal to or more than an upper limit temperature $\beta$, which is the upper limit threshold value, the sprung vibration damping controller 66 prohibits the sprung vibration damping to reduce a use of the battery 14. Note that the lower limit temperature $\alpha$ and upper limit temperature $\beta$ are previously set as values which are determined by proving upper/lower limit values of the temperature, in which the battery 14 is liable to be actually deteriorated, with a margin and stored in the storage unit 70 of the main ECU 50.

Figure 11:
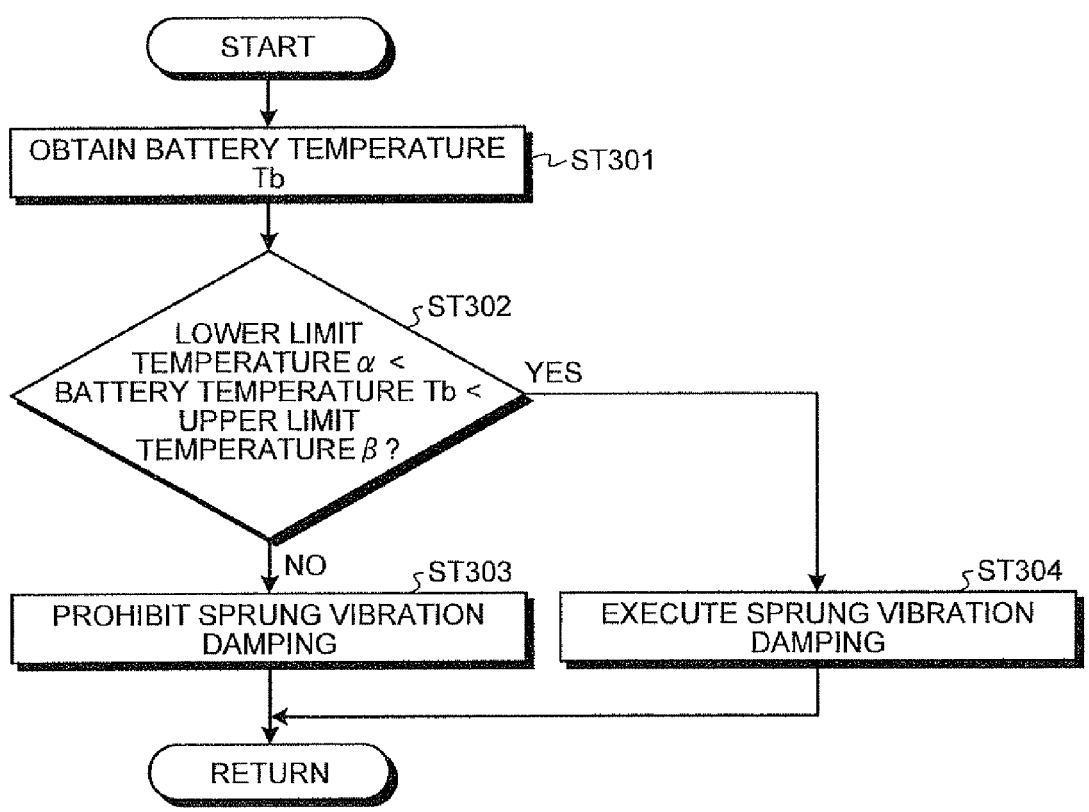
FIG. 11 is a flowchart showing a processing procedure of the vibration-damping controlling apparatus according to the fourth embodiment.

FIG. 11 is a flowchart showing a processing procedure of the vibration-damping controlling apparatus according to the fourth embodiment. Next, a control method by the vibration-damping controlling apparatus 110 according to the fourth embodiment, that is, the processing procedure by the vibration-damping controlling apparatus 110 will be explained. In the processing procedure by the vibration-damping controlling apparatus 110 according to the fourth embodiment, first, a battery temperature Tb is obtained (step ST301). The battery voltage Tb is obtained by the battery temperature obtaining unit 112 provided with the processing unit 85 of the battery ECU 53.

Next, whether or not lower limit temperature $\alpha$<battery temperature Tb<upper limit temperature $\beta$ is established is determined (step ST302). The determination is executed by the battery temperature determining unit 111 provided with the processing unit 61 of the main ECU 50, and the battery temperature determining unit 111 executes the determination by comparing the battery temperature Tb obtained by the battery temperature obtaining unit 112 with the lower limit temperature $\alpha$ and the upper limit temperature $\beta$ stored in the storage unit 70 of the main ECU 50.

When it is determined by the determination in the battery temperature determining unit 111 (step ST302) that lower limit temperature $\alpha$<the battery temperature Tb<upper limit temperature $\beta$ is not established, that is, when it is determined that the battery temperature Tb upper limit temperature $\beta$ or it is determined that the battery temperature Tb$\leq$lower limit temperature $\alpha$, the sprung vibration damping is prohibited (step ST303). The sprung vibration damping is prohibited by the sprung vibration damping controller 66 provided with the processing unit 61 of the main ECU 50. When the sprung vibration damping is prohibited by the sprung vibration damping controller 66, a process passes through the processing procedure.

In contrast, when it is determined by the determination in the battery temperature determining unit 111 (step ST302) that lower limit temperature $\alpha$<battery temperature Tb<upper limit temperature $\beta$ is established, the sprung vibration damping is executed (step ST304). That is, when the battery temperature Tb is between the lower limit temperature $\alpha$ and the upper limit temperature $\beta$, the sprung vibration damping controller 66 executes the sprung vibration damping in response to the sprung vibration.

When the battery temperature Tb is equal to or more than the upper limit temperature $\beta$ or equal to or less than the lower limit temperature $\alpha$, since the vibration-damping controlling apparatus 110 described above prohibits the sprung vibration damping, the deterioration of the battery 14 can be suppressed. That is, when the battery 14 is used in the state that the temperature is excessively high or excessively low, the battery 14 is liable to be deteriorated. Accordingly, the use of the battery 14 in the state that the battery 14 is liable to be deteriorated can be reduced by prohibiting the sprung vibration damping when the battery temperature Tb is equal to or more than the upper limit temperature $\beta$ and equal to or less than the lower limit temperature $\alpha$. With the operation, since the deterioration of the battery 14 can be suppressed, the other control executed using the power of the battery 14 can be more reliably executed. As a result, it can be more reliably suppressed that the other control is under the influence of the execution of the sprung vibration damping control.

Fifth Embodiment

Figure 12:
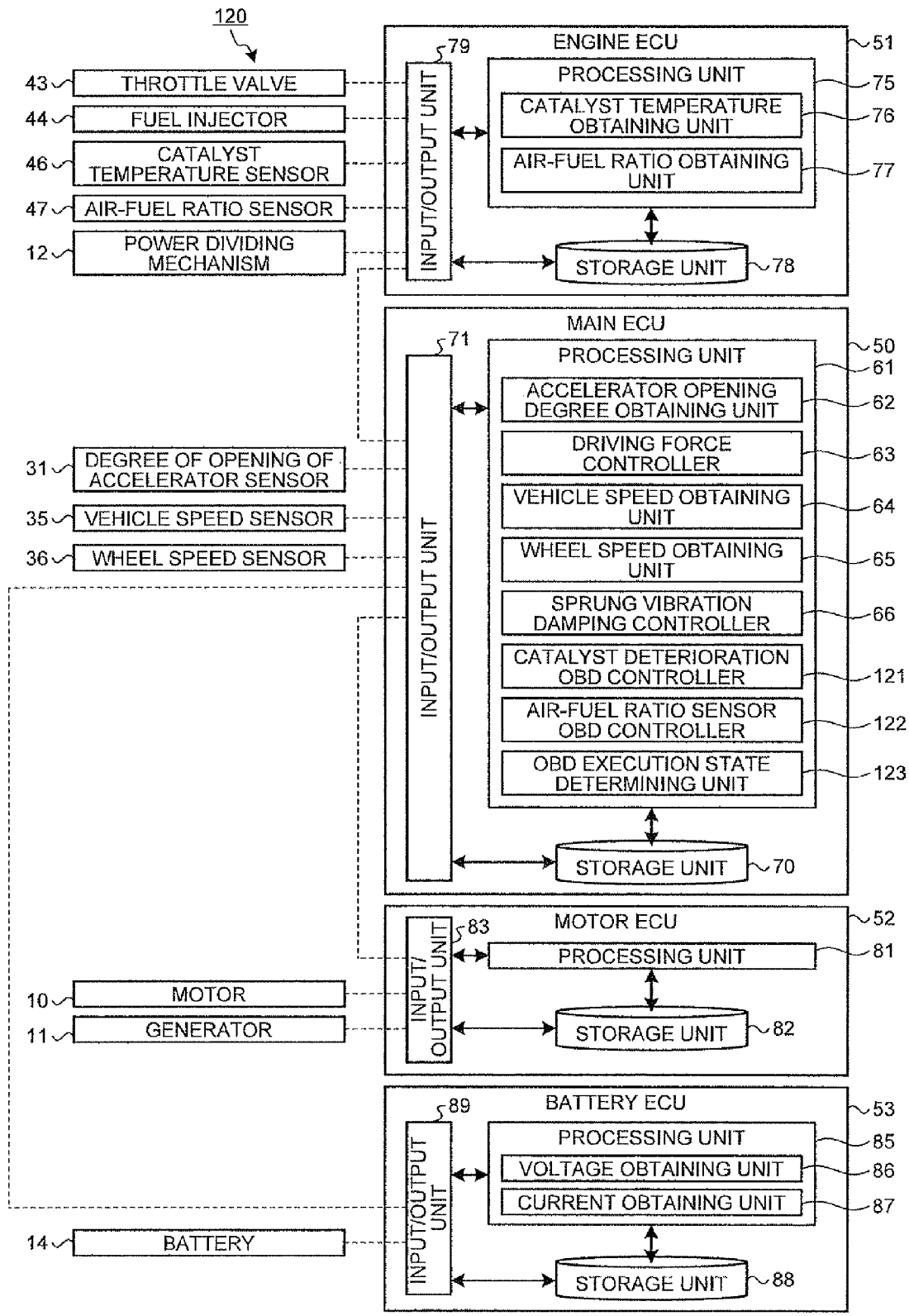
FIG. 12 is a main portion configuration view of a vibration-damping controlling apparatus according to a fifth embodiment.

Although a vibration-damping controlling apparatus 120 according to a fifth embodiment has approximately the same configuration as the vibration-damping controlling apparatus 2 according to the first embodiment, the vibration-damping controlling apparatus 120 has a feature in that whether or not the sprung vibration damping is executed is determined based the execution state of a self-failure diagnosis control. Since the other configuration is the same as the first embodiment, explanation of the other configuration is omitted as well as the same reference numerals are attached. FIG. 12 is a main portion configuration view of the vibration-damping controlling apparatus according to the fifth embodiment. The vibration-damping controlling apparatus 120 according to the fifth embodiment is provided with the self-failure diagnosis control so that the control can be executed thereby, and specifically is provided with a catalyst deterioration On Board Diagnosis (OBD) as a self-failure diagnosis control that diagnoses whether or not the catalyst 45 is deteriorated and with an air-fuel ratio sensor OBD as a self-failure diagnosis control that diagnoses whether or not the air-fuel ratio sensor 47 fails. Further, in the vibration-damping controlling apparatus 120 according to the fifth embodiment, the execution states of the catalyst deterioration OBD and the air-fuel ratio sensor OBD are used to determine whether or not the sprung vibration damping control is prohibited.

Therefore, in the vibration-damping controlling apparatus 120 according to the fifth embodiment, the processing unit 61 of the main ECU 50 further includes a catalyst deterioration OBD controller 121 as a failure diagnosis controlling means for a purification means that controls the catalyst deterioration OBD, an air-fuel ratio sensor OBD controller 122 as a failure diagnosis controlling means for an air-fuel ratio detecting means that controls the air-fuel ratio sensor OBD, and an OBD execution state determining unit 123 as a self-failure diagnosis execution state determining means that determines the execution states of the catalyst deterioration OBD and the air-fuel ratio sensor OBD in addition to the accelerator opening degree obtaining unit 62, the driving force controller 63, the vehicle speed obtaining unit 64, the wheel speed obtaining unit 65, and the sprung vibration damping controller 66. Among them, the catalyst deterioration OBD controller 121 and the air-fuel ratio sensor OBD controller 122 are disposed as the self-failure diagnosis controlling means that executes the self-failure diagnosis control.

The vibration-damping controlling apparatus 120 according to the fifth embodiment is configured as described above, and an operation of the vibration-damping controlling apparatus 120 will be explained below. In the vibration-damping controlling apparatus 120 according to the fifth embodiment, to diagnose the deterioration of the catalyst 45 and the failure of the air-fuel ratio sensor 47 while the vehicle 1 travels, the vibration-damping controlling apparatus 120 executes the catalyst deterioration OBD and the air-fuel ratio sensor OBD when a predetermined execution condition such as a predetermined period is established when the vehicle 1 travels. Among them, when the catalyst deterioration OBD is executed, a control signal is transmitted from the catalyst deterioration OBD controller 121 provided with the processing unit 61 of the main ECU 50 to an engine ECU 51 to change an air-fuel ratio of an air fuel mixture when a fuel is combusted in a combustion chamber 40 of the engine 5 from an air-fuel ratio suitable for the traveling state of the vehicle 1 to an arbitrary air-fuel ratio. The engine ECU 51 which receives the control signal changes the air-fuel ratio by controlling a fuel injector 44 and the like. The catalyst deterioration OBD controller 121 obtains the temperature and the air-fuel ratio of the catalyst 45 when the air-fuel ratio is changed as described above from the catalyst temperature obtaining unit 76 and the air-fuel ratio obtaining unit 77 provided with the engine ECU 51 and estimates the deterioration state of the catalyst 45 from the obtained result.

Further, when the air-fuel ratio sensor OBD is executed, a control signal is transmitted from the air-fuel ratio sensor OBD controller 122 provided with the processing unit 61 of the main ECU 50 to the engine ECU 51 to change the air-fuel ratio suitable for the traveling state of the vehicle 1 to an arbitrary air-fuel ratio likewise when the catalyst deterioration OBD is executed. With the operation, the engine ECU 51 changes the air-fuel ratio of the air fuel mixture. The air-fuel ratio sensor OBD controller 122 obtains the air-fuel ratio when the air-fuel ratio is changed as described above from the air-fuel ratio obtaining unit 77 provided with the engine ECU 51 and estimates the deterioration state and the failure of the air-fuel ratio sensor 47 from the obtained result.

Further, when the air-fuel ratio is changed to execute the catalyst deterioration OBD and the air-fuel ratio sensor OBD as described above, although the output of the engine 5 is varied by the change of the air-fuel ratio, when the output of the engine 5 varies, a driving force in traveling is subjected to an influence thereof. That is, when the catalyst deterioration OBD and the air-fuel ratio sensor OBD are executed, the output of the engine 5 may be reduced by the change of the air-fuel ratio, and the driving force decreases in this case. Therefore, when the catalyst deterioration OBD and the air-fuel ratio sensor OBD are executed, the catalyst deterioration OBD controller 121 and the air-fuel ratio sensor OBD controller 122 output commands for increasing an output to the engine ECU 51 when the catalyst deterioration OBD and the air-fuel ratio sensor OBD are executed.

When the catalyst deterioration OBD and the air-fuel ratio sensor OBD are executed, the deterioration of the catalyst 45 and the failure of the air-fuel ratio sensor 47 are diagnosed while securing the traveling performance by increasing the output of the engine 5 as described above. Further, the variation of the output of the engine 5 caused by executing the catalyst deterioration OBD and the air-fuel ratio sensor OBD is absorbed by the output of the motor 10 by adjusting the output of the motor 10 by transmitting a control signal to the motor ECU 52 so that the driving force keeps the required driving force.

When the catalyst deterioration OBD and the air-fuel ratio sensor OBD are executed, since the output of the engine 5 is varied as described above, although the output of the motor 10 is varied to absorb the variation, the motor 10 is used when the sprung vibration damping control is executed. That is, since the sprung vibration damping suppresses the sprung vibration by controlling the torque of the motor 10, when the sprung vibration damping control is executed in a state that the output of the motor 10 is varied at the time the catalyst deterioration OBD and the air-fuel ratio sensor OBD are executed, the torque of the motor 10 may not be accurately controlled. Therefore, when the catalyst deterioration OBD and the air-fuel ratio sensor OBD are executed, the sprung vibration damping controller 66 prohibits the sprung vibration damping to secure the traveling performance of the vehicle 1 when the catalyst deterioration OBD and the air-fuel ratio sensor OBD are executed.

Figure 13:
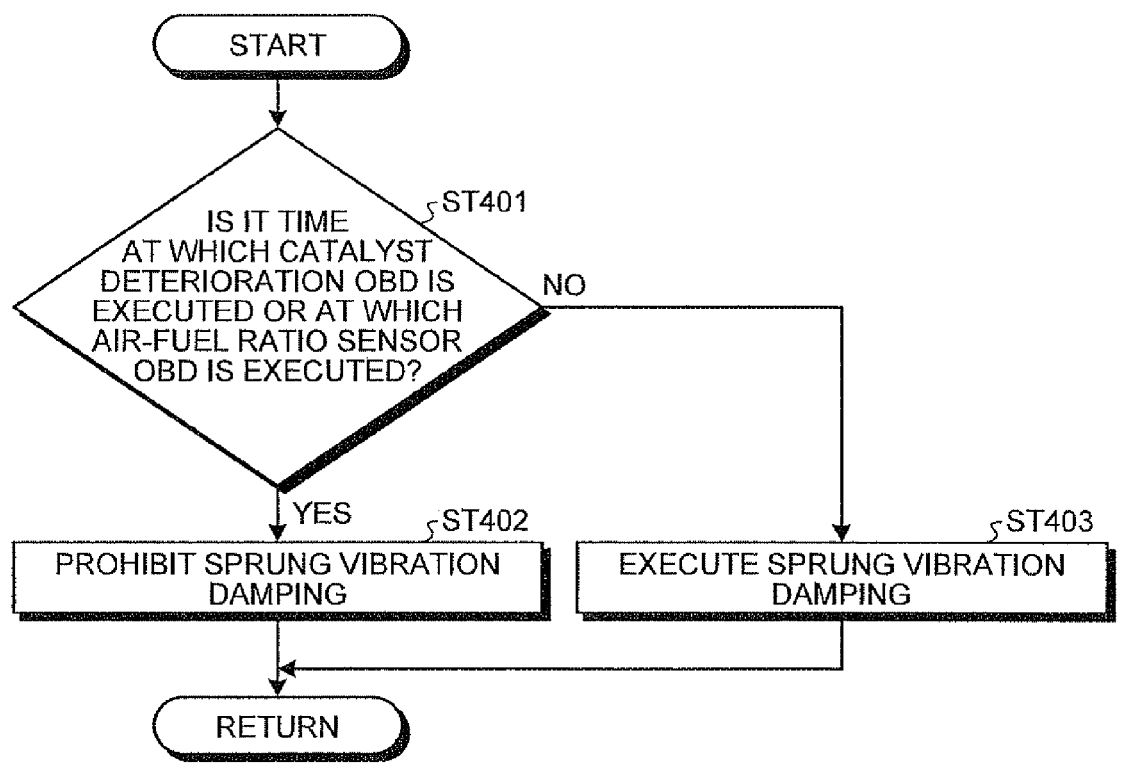
FIG. 13 is a flowchart showing a processing procedure of the vibration-damping controlling apparatus according to the fifth embodiment.

FIG. 13 is a flowchart showing a processing procedure of the vibration-damping controlling apparatus according to the fifth embodiment. Next, a control method by the vibration-damping controlling apparatus 120 according to the fifth embodiment, that is, the processing procedure by the vibration-damping controlling apparatus 120 will be explained. In the processing procedure by the vibration-damping controlling apparatus 120 according to the fifth embodiment, first, whether or not it is a time at which the catalyst deterioration OBD is executed or at which the air-fuel ratio sensor OBD is executed is determined (step ST401). The determination is executed by the OBD execution state determining unit 123 provided with the processing unit 61 of the main ECU 50. The catalyst deterioration OBD and the air-fuel ratio sensor OBD are executed when the predetermined execution condition is established. Among them, the catalyst deterioration OBD is executed by being controlled by the catalyst deterioration OBD controller 121 provided with the processing unit 61 of the main ECU 50, and the air-fuel ratio sensor OBD is executed by being controlled by the air-fuel ratio sensor OBD controller 122 provided with the processing unit 61 of the main ECU 50. Therefore, the OBD execution state determining unit 123 determines whether it is the time at which the catalyst deterioration OBD is executed or the time at which the air-fuel ratio sensor OBD is executed by receiving control signals from the catalyst deterioration OBD controller 121 and the air-fuel ratio sensor OBD controller 122.

When it is determined that it is the time at which the catalyst deterioration OBD is executed or at which the air-fuel ratio sensor OBD is executed by the determination in the OBD execution state determining unit 123 (step ST401), the sprung vibration damping is prohibited (step ST402). The sprung vibration damping is prohibited by the sprung vibration damping controller 66 provided with the processing unit 61 of the main ECU 50.

When the sprung vibration damping is prohibited by the sprung vibration damping controller 66, a process passes through the processing procedure.

In contrast, when it is determined by the determination in the OBD execution state determining unit 123 (step ST401) that it is not the time at which the catalyst deterioration OBD is executed and at which the air-fuel ratio sensor OBD is executed, the sprung vibration damping is executed (step ST403). That is, when the sprung vibration is generated to the vehicle 1 in a case other than the case in which the catalyst deterioration OBD is executed and the case in which the air-fuel ratio sensor OBD is executed, the sprung vibration damping controller 66 executes the sprung vibration damping in response to the sprung vibration.

Since the vibration-damping controlling apparatus 120 described above prohibits the sprung vibration damping when it is the time at which the catalyst deterioration OBD is executed and at which the air-fuel ratio sensor OBD is executed, the vibration-damping controlling apparatus 120 can execute an appropriate control. That is, since the output of the engine 5 is varied when it is the time at which the catalyst deterioration OBD is executed and at which the air-fuel ratio sensor OBD is executed, the torque of the motor 10 is changed in response to the variation. However, since the sprung vibration damping is also executed by controlling the torque of the motor 10, when the catalyst deterioration OBD or the air-fuel ratio sensor OBD and the sprung vibration damping are executed at the same time, it may become difficult to execute a correct and proper control and to generate an appropriate driving force. Therefore, when the catalyst deterioration OBD is executed and when the air-fuel ratio sensor OBD is executed, the catalyst deterioration OBD and the air-fuel ratio sensor OBD can be more reliably executed by prohibiting the sprung vibration damping. That is, when the catalyst deterioration OBD is executed and when the air-fuel ratio sensor OBD is executed, the driving force when the catalyst deterioration OBD and the air-fuel ratio sensor OBD are executed can be more appropriately controlled by prohibiting the sprung vibration damping and thus the traveling performance of the vehicle 1 can be secured when these controls are executed. As a result, it can be more reliably suppressed that the other control is under the influence of the execution of the sprung vibration damping control.

Note that the vibration-damping controlling apparatus 120 described above executes the catalyst deterioration OBD and the air-fuel ratio sensor OBD as the self-failure diagnosis control and uses the execution states of the catalyst deterioration OBD and the air-fuel ratio sensor OBD to the determination whether or not the sprung vibration damping control is prohibited. However, the self-failure diagnosis control used to the determination whether or not the sprung vibration damping control is prohibited may be other than the catalyst deterioration OBD and the air-fuel ratio sensor OBD. The self-failure diagnosis control used to the determination whether or not the sprung vibration damping control is prohibited may be any control by which the output of the engine 5 is varied when the control is executed. As described above, when the self-failure diagnosis control, by which the output of the engine 5 is varied, is executed, the self-failure diagnosis control can be more reliably executed by prohibiting the sprung vibration damping executed by controlling the torque of the motor 10. As a result, the traveling performance of the vehicle 1 can be secured when the self-failure diagnosis control is executed and it can be more reliably suppressed that the other control is under the influence of the execution of the sprung vibration damping control.

Sixth Embodiment

Figure 14:
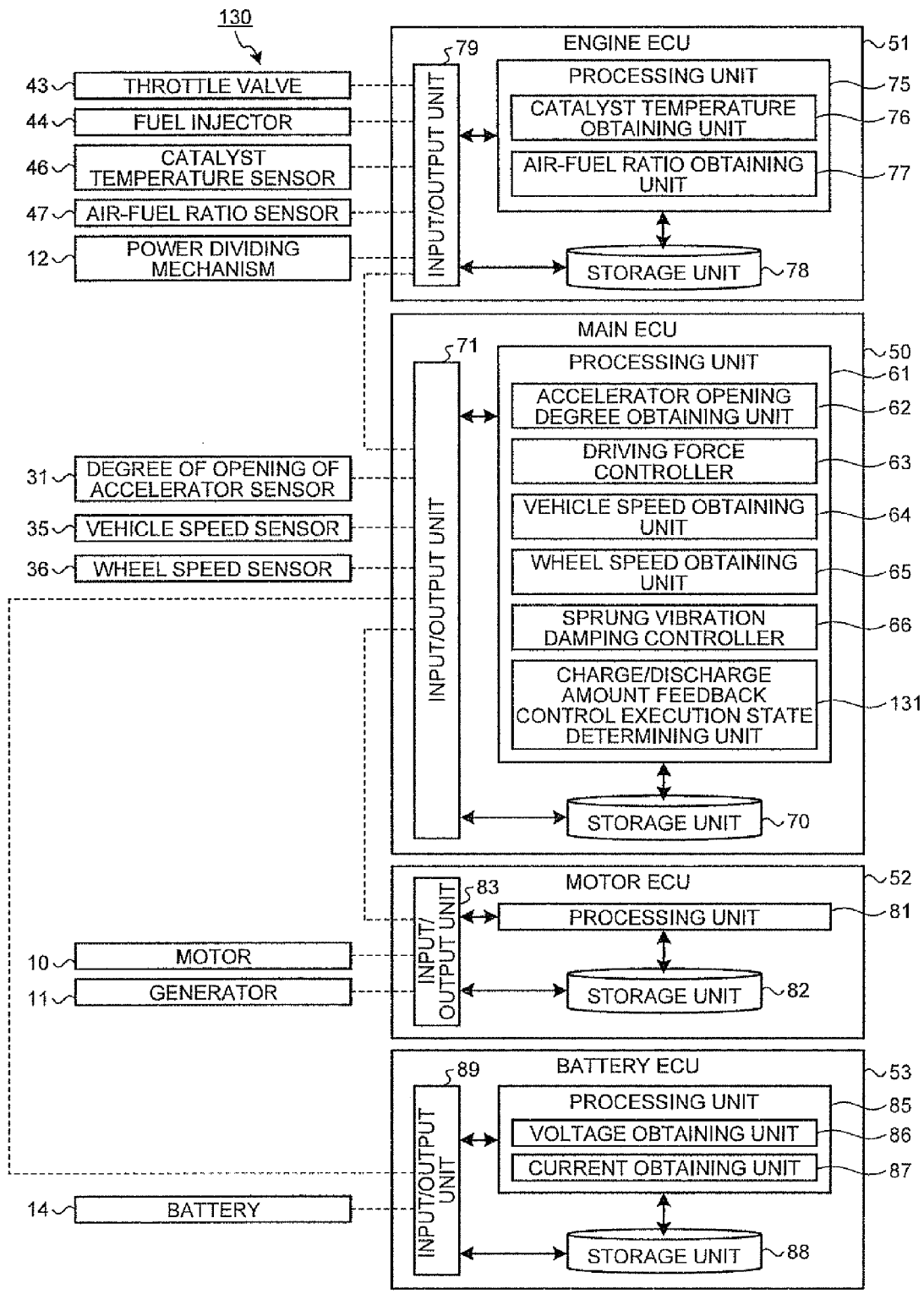
FIG. 14 is a main portion configuration view of a vibration-damping controlling apparatus according to a sixth embodiment.

Although a vibration-damping controlling apparatus 130 according to an sixth embodiment has approximately the same configuration as the vibration-damping controlling apparatus 2 according to the first embodiment, the vibration-damping controlling apparatus 130 has a feature in that the sprung vibration damping control is changed depending on whether or not a charge/discharge amount feedback control is being executed. Since the other configuration is the same as the first embodiment, explanation of the other configuration is omitted as well as the same reference numerals are attached. FIG. 14 is a main portion configuration view of the vibration-damping controlling apparatus according to the sixth embodiment. The vibration-damping controlling apparatus 130 according to the sixth embodiment differently controls the sprung vibration in response to the execution state of the charge/discharge amount feedback control. Therefore, in the vibration-damping controlling apparatus 130 according to the sixth embodiment, the processing unit 61 of the main ECU 50 further includes a charge/discharge amount feedback control execution state determining unit 131 as a charge/discharge amount feedback control execution state determining means that determines the execution state of the charge/discharge amount feedback control in addition to the accelerator opening degree obtaining unit 62, the driving force controller 63, the vehicle speed obtaining unit 64, the wheel speed obtaining unit 65, and the sprung vibration damping controller 66.

The vibration-damping controlling apparatus 130 according to the sixth embodiment is configured as described above, and an operation of the vibration-damping controlling apparatus 130 will be explained below. While the vehicle 1 travels, the power of the battery 14 is monitored by the battery ECU 53, and the charge/discharge amount feedback control, which is a control for keeping the charge/discharge amount of the battery 14 to an appropriate amount, is executed. More specifically, the charge/discharge amount feedback control controls and adjusts the distribution of the output of an engine 5, which is being driven, and the output of a motor 10 and the amount of power generated by a generator 11 by the main ECU 50 in response to the power of a battery 14 monitored by the battery ECU 53, thereby adjusting the charge amount and the discharge amount of the battery 14. With the operation, the charge/discharge amount of the battery 14 is kept within a predetermined range.

Further, in the sprung vibration damping control, since the torque of the motor 10 is adjusted in response to the sprung vibration, the power of the battery 14 is periodically varied while the sprung vibration damping control is executed. However, when the power of the battery 14 is varied, a charge/discharge amount feedback amount is also varied in the charge/discharge amount feedback control. Since the charge/ discharge amount feedback control is executed by adjusting the output of the engine 5, the output of the motor 10, and the like, when the charge/discharge amount feedback amount is varied as described above, the output of the engine 5 is also varied, and thus the number of revolution of the engine 5 and the torque of the engine 5 may be varied. Therefore, vibration may be increased by that the number of revolution of the engine 5 becomes the number of revolution by which vibration is liable to be generated and the traveling performance may be deteriorated by that the torque is varied.

As described above, the charge/discharge amount feedback control is liable to interfere with the sprung vibration damping control. However, since the charge/discharge amount feedback control is frequently or continuously executed, when the sprung vibration damping control is prohibited at the time the charge/discharge amount feedback control is executed for the purpose of avoiding the interference of the controls, there is a possibility that a chance for executing the sprung vibration damping control is greatly reduced. Therefore, while the charge/discharge amount feedback control is executed, the sprung vibration damping controller 66 restricts the sprung vibration damping control by reducing a control amount when the sprung vibration damping control is executed, thereby reducing an amount of interference of the controls.

Figure 15:
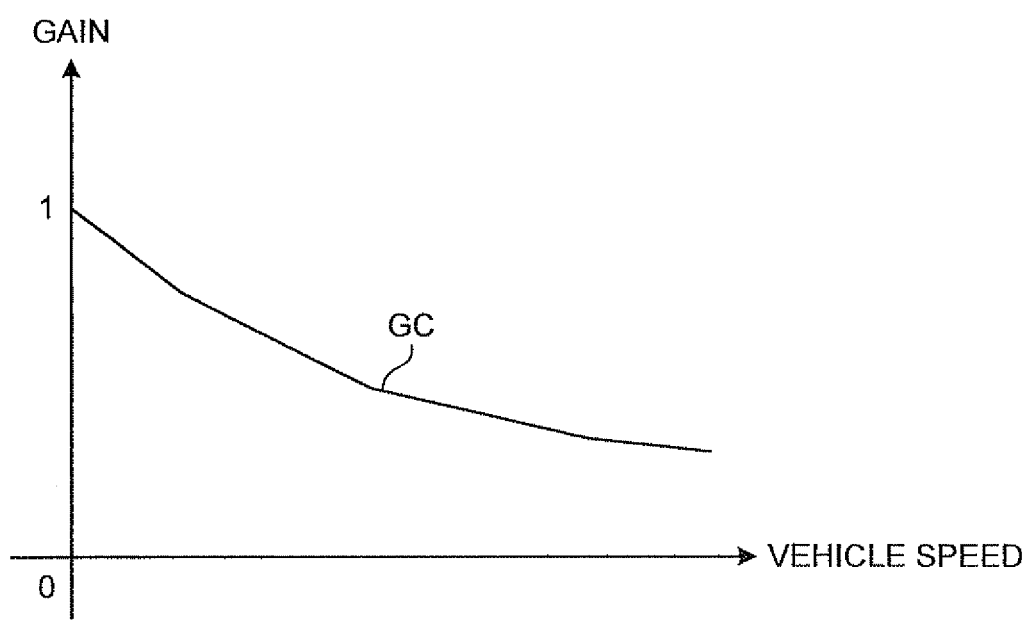
FIG. 15 is an explanatory view of a sprung vibration damping control gain that is changed in response a vehicle speed.

FIG. 15 is an explanatory view of an sprung vibration damping control gain that is changed in response a vehicle speed. When the control amount at the time the sprung vibration damping control is reduced while the charge/discharge amount feedback control is executed, the control amount is reduced by making an sprung vibration damping control gain GC as the sprung vibration damping control gain smaller than 1. As described above, when the sprung vibration damping control gain GC is made smaller than 1, the sprung vibration damping can be restricted by reducing an amount of correction of the torque of the motor 10 when the sprung vibration damping control is executed. Accordingly, when the sprung vibration damping control is executed while the charge/discharge amount feedback control is executed, an amount of interference of the controls can be reduced.

Further, the sprung vibration is controlled by adjusting the torque of the motor 10. However, when the vehicle speed increases, since the output of the motor 10 is increased, an increase of the vehicle speed increases a correction amount of the output of the motor 10 when the sprung vibration is suppressed. That is, the increase of the vehicle speed increases the output of the motor 10 when the sprung vibration is suppressed. Therefore, when the sprung vibration damping control gain GC is made smaller than 1 while the charge/discharge amount feedback control is executed, the sprung vibration damping control gain GC is made smaller as the vehicle speed is increased as shown in FIG. 15.

Figure 16:
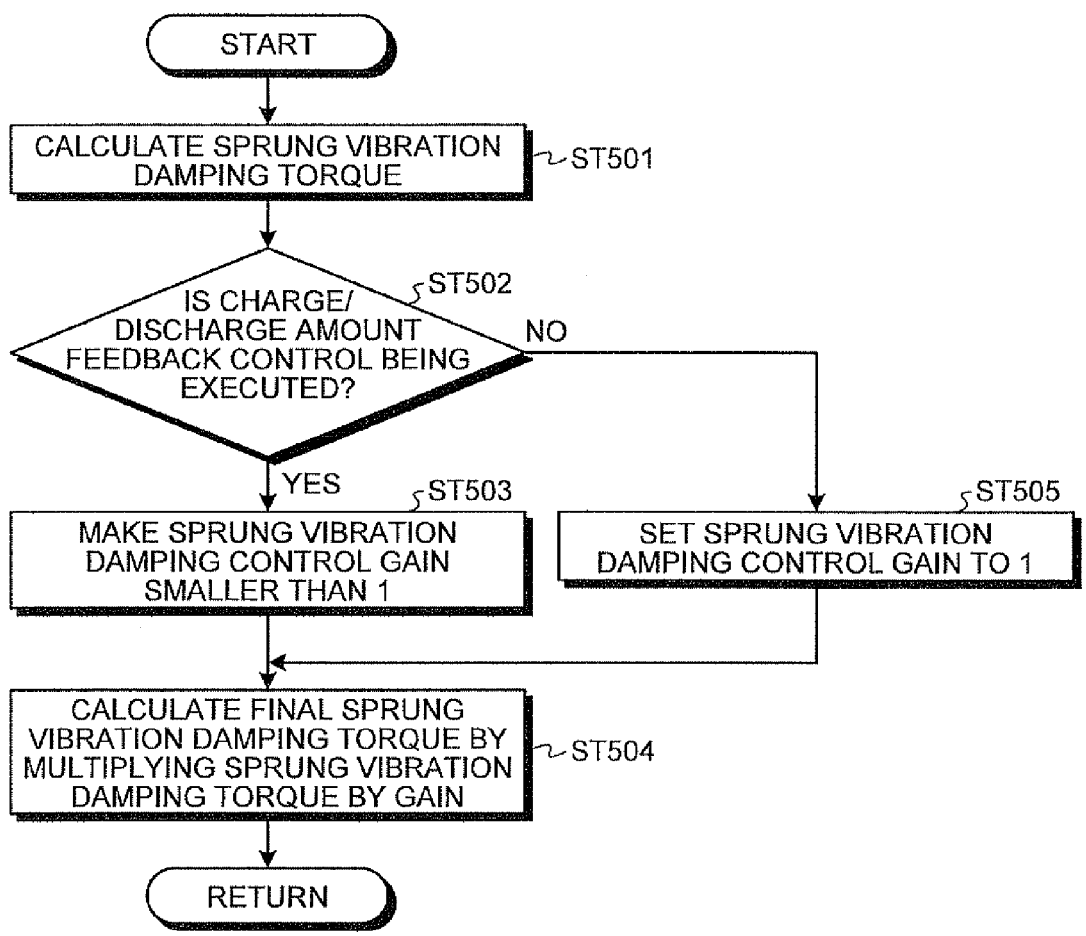
FIG. 16 is a flowchart showing a processing procedure of the vibration-damping controlling apparatus according to the sixth embodiment.

FIG. 16 is a flowchart showing a processing procedure of the vibration-damping controlling apparatus according to the sixth embodiment. Next, a control method by the vibration-damping controlling apparatus 130 according to the sixth embodiment, that is, the processing procedure by the vibration-damping controlling apparatus 130 will be explained. In the processing procedure by the vibration-damping controlling apparatus 130 according to the sixth embodiment, first, sprung vibration damping torque is calculated (step ST501). The calculation is executed by the sprung vibration damping controller 66 provided with the processing unit 61 of the main ECU 50. The sprung vibration damping controller 66 estimates the sprung vibration based on results of detection in a accelerator opening degree sensor 31 and in a wheel speed sensor 36 and calculates a correction value of a driving force for suppressing the sprung vibration. That is, the sprung vibration damping controller 66 calculates the sprung vibration damping torque, which is the correction value of the driving force for suppressing the sprung vibration, based on the results of detection in the accelerator opening degree sensor 31, and the like.

Next, whether or not the charge/discharge amount feedback control is being executed is determined (step ST502). The determination is executed by the charge/discharge amount feedback control execution state determining unit 131 provided with the processing unit 61 of the main ECU 50. The charge/discharge amount feedback control execution state determining unit 131 determines whether or not the charge/discharge amount feedback control is being executed by obtaining a charge requirement command and a discharge requirement command which are transmitted from the battery ECU 53 to an engine ECU 51.

When it is determined that the charge/discharge amount feedback control is being executed by the determination in the charge/discharge amount feedback control execution state determining unit 131 (step ST502), the sprung vibration damping control gain is made smaller than 1 (step ST503). The sprung vibration damping control gain at the time the gain is made smaller than 1 as described above is determined by the sprung vibration damping controller 66. More specifically, the relation between the sprung vibration damping control gain GC and the vehicle speed as shown in FIG. 15 is previously stored in a storage unit 70 of the main ECU 50, and the sprung vibration damping control gain GC in the vehicle speed obtained by the vehicle speed obtaining unit 64 is determined by the sprung vibration damping controller 66 based on the relation among the vehicle speed obtained by the vehicle speed obtaining unit 64, the sprung vibration damping control gain GC stored in the storage unit 70, and the vehicle speed. Since the sprung vibration damping control gain GC stored in the storage unit 70 is set smaller than 1, the sprung vibration damping control gain GC, which is determined based on the relation between the sprung vibration damping control gain GC stored in the storage unit 70 and the vehicle speed becomes smaller than 1.

Next, final sprung vibration damping torque is calculated by multiplying the sprung vibration damping torque by the gain (step ST504). The calculation is executed by the sprung vibration damping controller 66. The sprung vibration damping controller 66 multiplies the sprung vibration damping torque, which is calculation based on the results of detection in the accelerator opening degree sensor 31 and the like (step ST501) by the sprung vibration damping control gain GC determined based on the vehicle speed and the like, thereby calculating the final sprung vibration damping torque when the sprung vibration damping control is actually executed at the time the sprung vibration damping control is executed. The sprung vibration damping controller 66 executes the sprung vibration damping by the calculated sprung vibration damping torque.

In contrast, when it is determined by determination in the charge/discharge amount feedback control execution state determining unit 131 (step ST502) that the charge/discharge amount feedback control is not being executed, the sprung vibration damping controller 66 sets the sprung vibration damping control gain to 1 (step ST505). Next, the sprung vibration damping controller 66 calculates the final sprung vibration damping torque by multiplying the sprung vibration damping torque by the gain (step ST504). That is, the sprung vibration damping control is executed by multiplying the sprung vibration damping torque, which is calculated based on the result of detection and the like in the accelerator opening degree sensor 31 (step ST501) by the sprung vibration damping control gain GC whose value is set to 1 by the sprung vibration damping controller 66, thereby executing the sprung vibration damping without reducing the sprung vibration damping torque.

Since the vibration-damping controlling apparatus 130 described above restricts the sprung vibration damping by making the sprung vibration damping control gain GC smaller than 1 while the charge/discharge amount feedback control is executed, it can be suppressed that the controls interfere with each other when the charge/discharge amount feedback control is executed. With the operation, it can be suppressed that vibration is increased and the traveling performance is deteriorated by that the number of revolution of the engine 5 and the torque of the engine 5 are varied due to the interference between the charge/discharge amount feedback control and the sprung vibration damping control. As a result, it can be suppressed that the other control is under the influence of the execution of the sprung vibration damping control.

Further, while the charge/discharge amount feedback control is executed, since the sprung vibration damping control gain GC is made smaller as the vehicle speed is increased, the sprung vibration damping can be executed while more reliably suppressing the interference between the charge/discharge amount feedback control and the sprung vibration damping control. That is, when the vehicle speed is high, since the output of the motor 10 is increased at the time the sprung vibration is suppressed, even when the sprung vibration damping control gain GC is made small, the sprung vibration damping torque, which is adjusted by controlling the output of the motor 10, can be made to a magnitude by which the sprung vibration can be suppressed. Further, when the vehicle speed is high, since the variation of the torque of the motor 10 caused by the sprung vibration damping control can be reduced by making the sprung vibration damping control gain GC small, the variation of the power of the battery 14 can be made small. With the operation, the variation of the charge/discharge amount feedback amount in the charge/discharge amount feedback control can be also made small. Accordingly, the interference between the charge/discharge amount feedback control and the sprung vibration damping control can be more reliably reduce and thus the deterioration of the traveling performance and the like caused by the interference between the controls can be suppressed. As a result, it can be more reliably suppressed that the other control is under the influence of the execution of the sprung vibration damping control.

Figure 17:
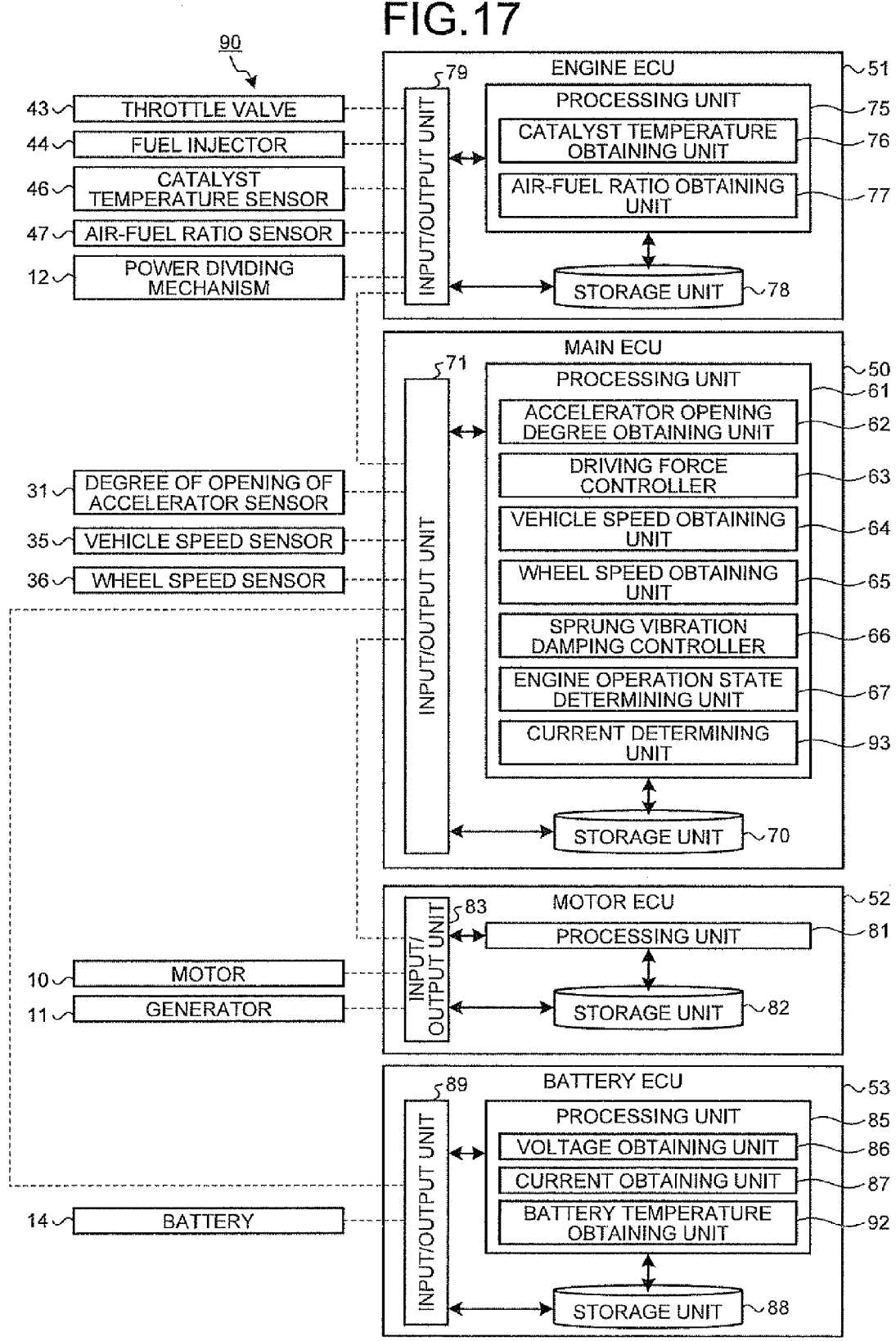
FIG. 17 is a main portion configuration view of a vibration-damping controlling apparatus according to a modification of the second embodiment.

FIG. 17 is a main portion configuration view of a vibration-damping controlling apparatus according to a modification of the second embodiment. Note that when whether or not the sprung vibration damping is prohibited is determined, the vibration-damping controlling apparatus 90 according to the second embodiment makes the determination based on the operation state of the engine 5 and the voltage of the battery 14. However, when it is determined whether or not the sprung vibration damping is prohibited, the determination may be made based on a current of the battery 14 and the power of the battery 14, a system voltage, which is a voltage by which the voltage of the battery 14 is increased, and the like in place of the voltage of the battery 14. A case, in which whether or not the sprung vibration damping is prohibited is determined based on the current of the battery 14, will be explained below. When whether or not the sprung vibration damping is prohibited is determined based on the current of the battery 14, the processing unit 61 of the main ECU 50 is disposed with a current determining unit 93 as a battery current determining means that determines whether or not the current of the battery 14 is within a predetermined range to in place of the voltage determining unit 91.

Figure 18:
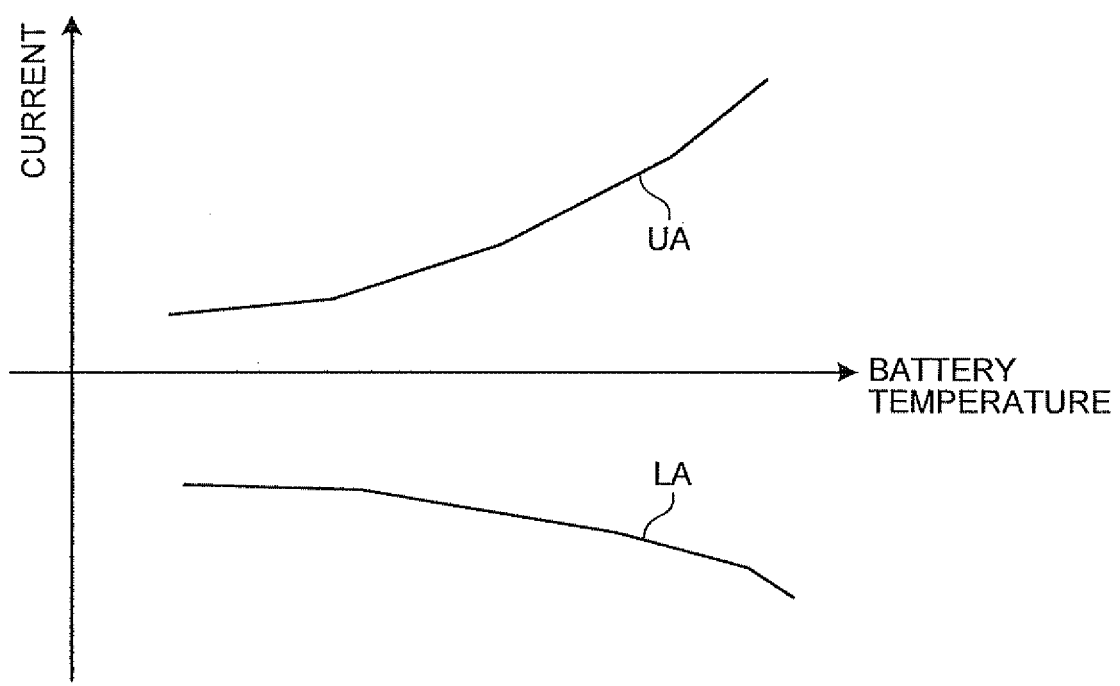
FIG. 18 is an explanatory view showing upper/lower limit threshold values of a voltage to a battery temperature.

FIG. 18 is an explanatory view showing upper/lower limit threshold values of a current to a battery temperature. In the battery 14, since the width of the upper/lower limit values of a voltage by which the battery 14 is liable to be deteriorated is narrowed as a temperature is made lower, in the vibration-damping controlling apparatus 90 according to the second embodiment, the threshold value of a voltage when whether or not the sprung vibration damping is prohibited is determined is changed by the temperature of the battery 14. In the case of the current, the width of the upper/lower limit values of a current by which the battery 14 is liable to be deteriorated is narrowed as a temperature is made lower likewise.

More specifically, since the motor 10, which is controlled when the sprung vibration damping control is executed, generates not only torque in a drive direction but also a torque in a regeneration direction, the battery 14 is discharged and charged. Accordingly, the current flows bidirectionally in a discharge direction and a charge direction to the battery 14 according to an operation state. As described above, in the upper/lower limit values of the current that flows bidirectionally, the threshold value of a current by which the battery 14 is liable to be deteriorated when the current flows in one direction is set as the upper limit value, and the threshold value of a current by which the battery 14 is liable to be deteriorated when the current flows in the other direction is set as the lower limit value. In the battery 14, the width between the upper limit value and the lower limit value is narrowed as a temperature is made lower.

Therefore, a current upper limit value UA, which is an upper limit threshold value of a current when whether or not the sprung vibration damping is prohibited, is made smaller as the temperature of the battery 14 is made lower as shown in FIG. 18, and a current lower limit value LA, which is a lower limit threshold value of a current when it is assumed that the current upper limit value UA is positive, is made larger as the temperature of the battery 14 is made lower as shown in FIG. 18. That is, the current lower limit value LA is the threshold value of a current which flows in the direction opposite to the flow direction of the current of the current upper limit value UA, and the width between the current upper limit value UA and the current lower limit value LA is narrowed as the temperature of the battery 14 is made lower and is widened as the temperature of the battery 14 is made higher on the contrary.

The sprung vibration damping controller 66 prohibits the sprung vibration damping when the current of the battery 14 is not between the current upper limit value UA and the current lower limit value LA which change in response to temperature. Note that the current upper limit value UA and the current lower limit value LA are previously set as values which are determined by proving the upper/lower limit values of a current, in which the battery 14 is liable to be actually deteriorated, with a margin and stored in the storage unit 70 of the main ECU 50.

Figure 19:
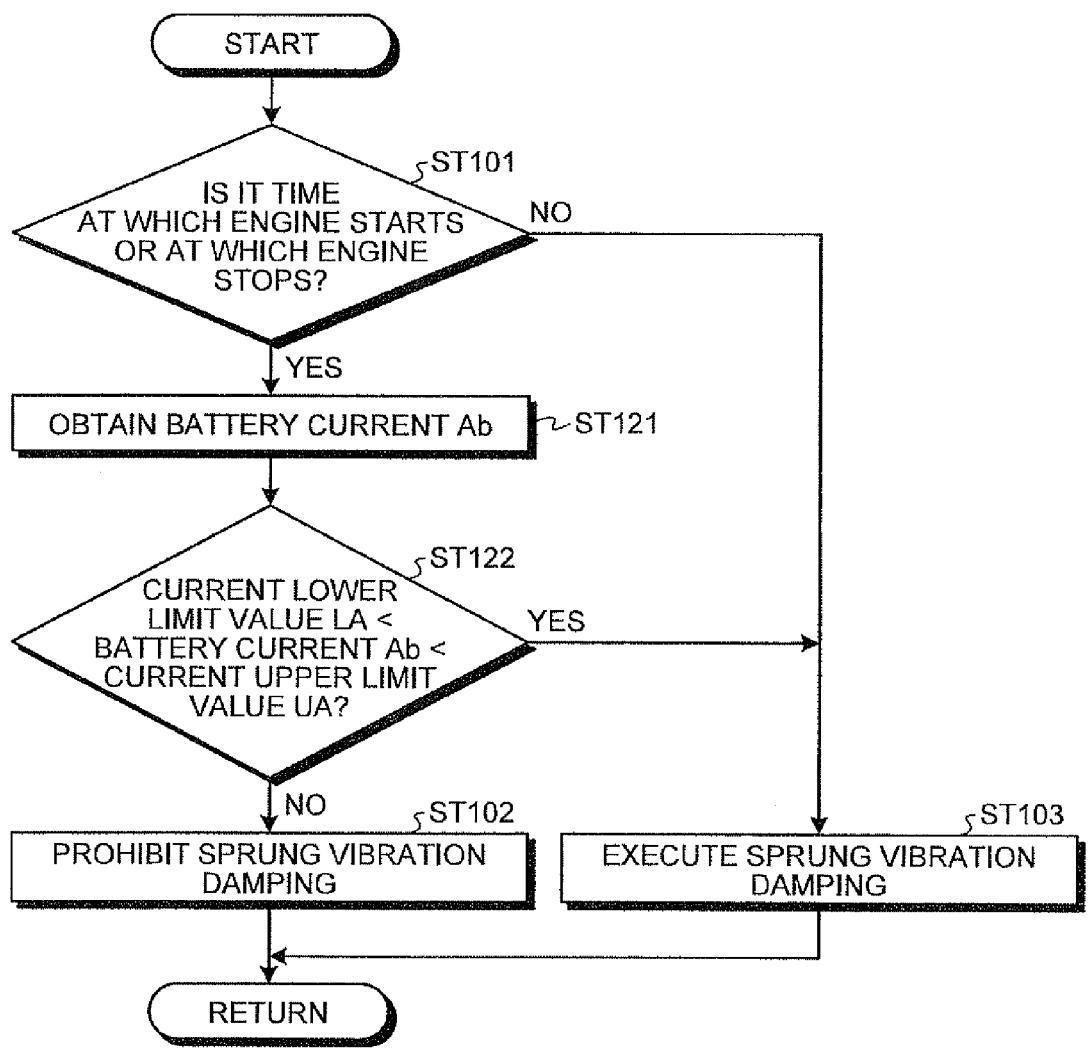
FIG. 19 is a flowchart showing a processing procedure of the vibration-damping controlling apparatus according to the modification of the second embodiment.

FIG. 19 is a flowchart showing a processing procedure of the vibration-damping controlling apparatus according to the modification of the second embodiment. As described above, whether or not the sprung vibration damping is prohibited is determined based on the operation state of the engine 5 and the current of the battery 14, first, whether it is a time at which the engine starts or the engine stops is determined by an engine operation state determining unit 67 provided with the processing unit 61 of the main ECU 50 (step ST101). When it is determined by the determination in the engine operation state determining unit 67 (step ST101) that it is the time at which the engine starts or the engine stops, next, the battery current Ab is obtained (step ST121). The battery current Ab is obtained by the current obtaining unit 87 provided with the processing unit 85 of the battery ECU 53.

Next, whether or not current lower limit value LA<battery current Ab<current upper limit value UA is established is determined (step ST122). The determination is executed by the current determining unit 93 provided with the processing unit 61 of the main ECU 50, and the current determining unit 93 executes the determination by comparing the battery current Ab, which is obtained by the current obtaining unit 87, with the current upper limit value UA and the current lower limit value LA which are stored in the storage unit 70 of the main ECU 50.

More specifically, the current upper limit value UA and the current lower limit value LA to the temperature of the battery 14 are preset as shown in FIG. 18 and stored in the storage unit 70 of the main ECU 50. Further, when the determination is executed by the current determining unit 93, the temperature of the battery 14 is further obtained by the battery temperature obtaining unit 92 provided with the processing unit 85 of the battery ECU 53 in addition to the battery current Ab. The current determining unit 93 calculates the current upper limit value UA and the current lower limit value LA at a present temperature of the battery 14 by the current upper limit value UA and the current lower limit value LA to the temperature of the battery 14 stored in the storage unit 70 of the main ECU 50 and the temperature of the battery 14 obtained by the battery temperature obtaining unit 92 and compares the calculated current upper limit value UA and current lower limit value LA with the battery current Ab obtained by the current obtaining unit 87. The current determining unit 93 determines whether or not current lower limit value LA<battery current Ab<current upper limit value UA is established by the comparison.

When it is determined that current lower limit value LA<battery current Ab<current upper limit value UA is not established, that is, when it is determined that battery current Ab≥current upper limit value UA is established, or when it is determined that battery current Ab≤current lower limit value LA is established by the determination in the current determining unit 93 (step ST122), the sprung vibration damping is prohibited (step ST102). The sprung vibration damping is prohibited by the sprung vibration damping controller 66 provided with the processing unit 61 of the main ECU 50. When the sprung vibration damping is prohibited by the sprung vibration damping controller 66, a process passes through the processing procedure.

In contrast, when it is determined by the determination (step ST101) in the engine operation state determining unit 67 that it is not the time at which the engine starts and the engine stops, or even when it is the time at which the engine starts and the engine stops, the sprung vibration damping is executed (step ST103) when it is determined by the determination in the current determining unit 93 (step ST122) that current lower limit value LA<battery current Ab<current upper limit value UA. That is, even when the engine starts and the engine stops, the sprung vibration damping controller 66 executes the sprung vibration damping in response to the sprung vibration when the battery current Ab is between the current upper limit value UA and the current lower limit value LA.

As described above, the battery 14, which is a power source of the power supplied to the motor 10 when the sprung vibration damping is executed, is unlike to be deteriorated even when the battery current Ab is between the current upper limit value UA and the current lower limit value LA likewise the case that the battery voltage Vb is between the voltage upper limit value UV and the voltage lower limit value LV. Therefore, even when it is determined that it is the time at which the engine 5 starts or stops, the sprung vibration damping can be executed while suppressing the deterioration of the battery 14 when the battery current Ab is between the current upper limit value UA and the current lower limit value LA, and a period in which the sprung vibration damping is executed can be increased. As a result, the sprung vibration can be more reliably suppressed while suppressing an influence of the execution of the sprung vibration damping control on the other control.

Further, the threshold value of a current, by which the battery 14 is liable to be deteriorated by that the current of the battery 14 becomes excessively high or becomes excessively low, is different depending on temperature likewise the threshold value of the voltage by which the battery 14 is liable to be deteriorated. Therefore, whether or not the battery 14 is in the state in which it is liable to be deteriorated can be more accurately determined by changing the current upper limit value UA and the current lower limit value LA, which are the threshold values when it is determined whether or not the sprung vibration damping is prohibited using the current of the battery 14 at the time the engine 5 starts or stops, in response to the temperature of the battery 14. Accordingly, when it is determined that it is the time at which the engine 5 starts or stops, it can be more properly determined the state in which the battery 14 is unlike to be deteriorated, and the period in which the sprung vibration damping is executed can be increased by executing the sprung vibration damping when the battery 14 is in the state in which it is unlike to be deteriorated. As a result, the sprung vibration can be more reliably suppressed while suppressing an influence of the execution of the sprung vibration damping control on the other control.

Figure 20:
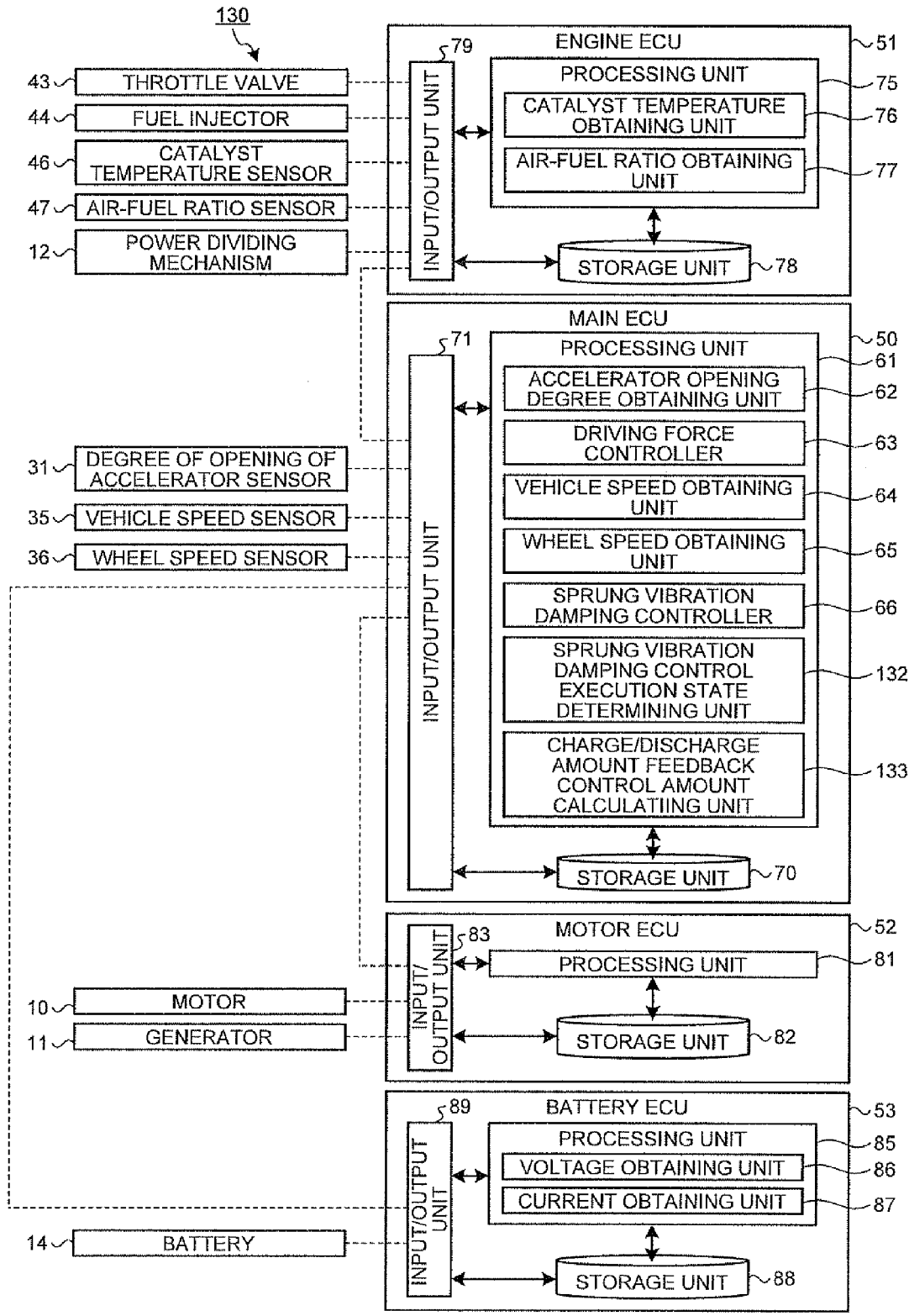
FIG. 20 is a main portion configuration view of a vibration-damping controlling apparatus according to a modification of the sixth embodiment.

FIG. 20 is a main portion configuration view of a vibration-damping controlling apparatus according to a modification of the sixth embodiment. Further, in the vibration-damping controlling apparatus 130 according to the sixth embodiment, to suppress the interference between the sprung vibration damping control and the charge/discharge amount feedback control, although the control amount of the sprung vibration damping is made small while the charge/discharge amount feedback control is executed, the interference of the controls may be suppressed by making the control amount of the charge/discharge amount feedback control while the sprung vibration damping control is executed on the contrary. In the case, the processing unit 61 of the main ECU 50 is disposed with an sprung vibration damping control execution state determining unit 132 as an sprung vibration damping control execution state determining means that determines an execution state of the sprung vibration damping control in place of the charge/discharge amount feedback control execution state determining unit 131. Further, the processing unit 61 of the main ECU 50 is disposed with a charge/discharge amount feedback control amount calculating unit 133 as a charge/discharge amount feedback control amount calculating means that calculates the control amount when the charge/discharge amount feedback control is executed.

Figure 21:
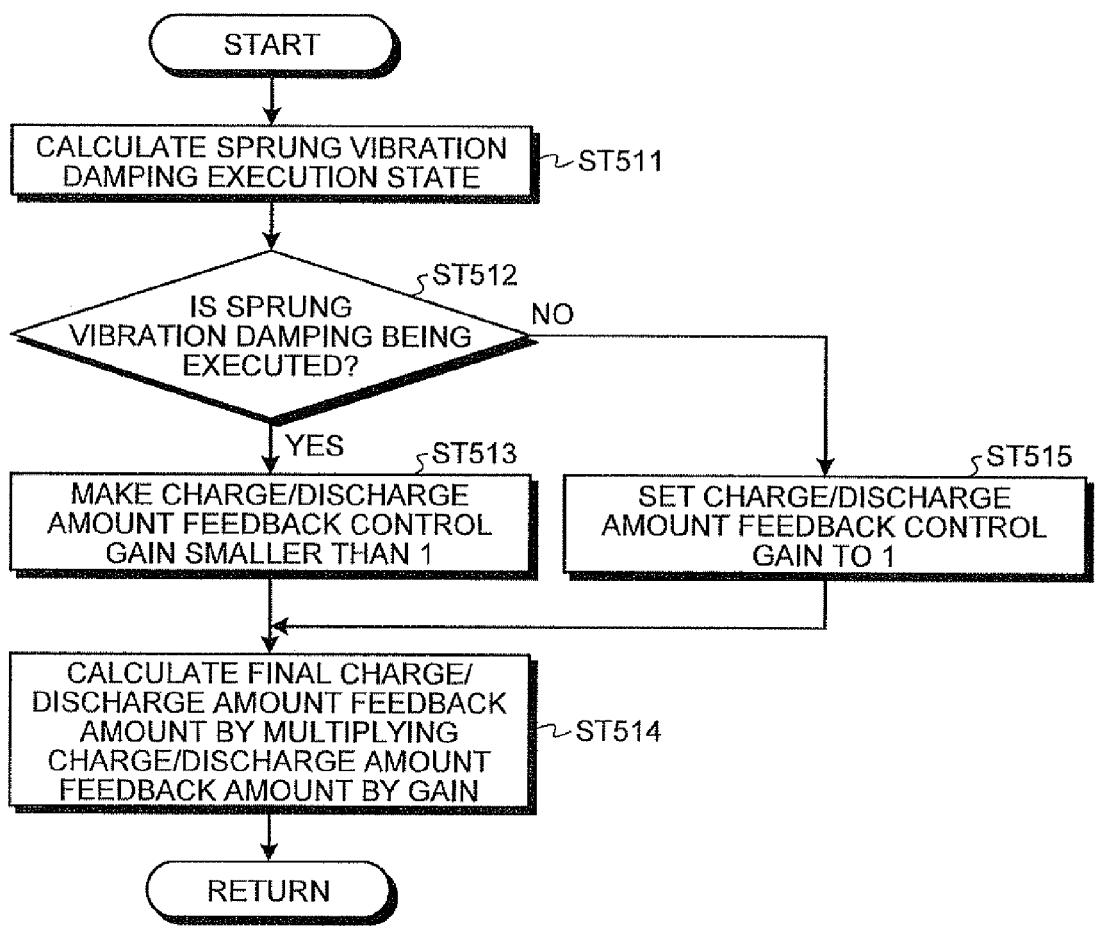
FIG. 21 is a flowchart showing a processing procedure of the vibration-damping controlling apparatus according to the modification of the sixth embodiment.

FIG. 21 is a flowchart showing a processing procedure of the vibration-damping controlling apparatus according to the modification of the sixth embodiment. As described above, when the interference of the controls is suppressed by making the control amount of the charge/discharge amount feedback control small while the sprung vibration damping control is executed, first, an sprung vibration damping execution state is calculated (step ST511). The calculation is executed by the sprung vibration damping controller 66 provided with the processing unit 61 of the main ECU 50. That is, the sprung vibration damping controller 66 estimates the sprung vibration based on a result of detection of the accelerator opening degree sensor 31, a result of detection of the wheel speed sensor 36, and the like and calculates the execution state of the sprung vibration damping in response to the estimated sprung vibration. Specifically, the sprung vibration damping controller 66 calculates, for example, sprung vibration damping torque as the execution state of the sprung vibration damping.

Next, whether or not the sprung vibration damping is being executed is determined (step ST512). The determination is executed by the sprung vibration damping control execution state determining unit 132 provided with the processing unit 61 of the main ECU 50. The sprung vibration damping control execution state determining unit 132 determines whether or not the sprung vibration damping is executed by the sprung vibration damping controller 66 by the execution state of the sprung vibration damping calculation by the sprung vibration damping controller 66.

When it is determined that the sprung vibration damping is being executed by the determination in the sprung vibration damping control execution state determining unit 132 (step ST512), the charge/discharge amount feedback control gain is made smaller than 1 (step ST513). As described above, when the charge/discharge amount feedback control gain which is a gain when the charge/discharge amount feedback control is executed is made smaller than 1, the gain is determined by the charge/discharge amount feedback control amount calculating unit 133 provided with the processing unit 61 of the main ECU 50. The charge/discharge amount feedback control gain, which is determined by the charge/discharge amount feedback control amount calculating unit 133, is determined in such a manner that a gain is previously set in a value smaller than 1 and stored in the storage unit 70 of the main ECU 50 and the charge/discharge amount feedback control amount calculating unit 133 determines the charge/discharge amount feedback control gain by reading the gain stored in the storage unit 70.

Next, a final charge/discharge amount feedback amount is calculated by multiplying the charge/discharge amount feedback amount by the gain (step ST514). The calculation is executed by the charge/discharge amount feedback control amount calculating unit 133. The charge/discharge amount feedback control amount calculating unit 133 multiplies the charge/discharge amount feedback amount, which is a control amount when the charge/discharge amount feedback control is executed by the battery ECU 53 and the main ECU 50, by the charge/discharge amount feedback control gain which is determined to the value smaller than 1. That is, the charge/discharge amount feedback control amount calculating unit 133 calculates the final charge/discharge amount feedback amount by multiplying the amount of power generated by a generator 11 and a regenerative amount in deceleration and further the charge/discharge amount feedback amount, which is a control amount when the discharge amount of the battery 14 is controlled by the charge/discharge amount feedback control gain in response to the charge amount and the power of the battery 14. With the operation, the charge/discharge amount feedback amount is made to a small value, and the battery ECU 53 and the main ECU 50 execute the charge/discharge amount feedback control by the final charge/discharge amount feedback amount.

In contrast, when it is determined that the sprung vibration damping is not being executed by the determination in the sprung vibration damping control execution state determining unit 132 (step ST512), the charge/discharge amount feedback control gain is made to 1 (step ST515). Next, the charge/discharge amount feedback control amount calculating unit 133 calculates the final charge/discharge amount feedback amount (step ST514) by multiplying the charge/discharge amount feedback amount by the gain. That is, the final charge/discharge amount feedback amount is made to a control amount in response to a present charge amount and power of the battery 14 by multiplying the charge/discharge amount feedback amount, which is a control amount when the charge/discharge amount feedback control is executed, by the charge/discharge amount feedback control gain whose value is made to 1 by the charge/discharge amount feedback control amount calculating unit 133. When the charge/discharge amount feedback control is executed, the control can be executed by being controlled by the final charge/discharge amount feedback amount without reducing the charge/discharge amount feedback amount.

As described above, when the interference between the sprung vibration damping control and the charge/discharge amount feedback control is suppressed, the controls can be suppressed from the interference also by making the charge/discharge amount feedback control gain smaller than 1 while the sprung vibration damping control is executed and restricting the charge/discharge amount feedback control. With the operation, a disadvantage such as vibration and the like, which is generated by the interference between the sprung vibration damping control and the charge/discharge amount feedback control, can be suppressed. As a result, it can be suppressed that the other control is under the influence of the execution of the sprung vibration damping control.

Further, in the vibration-damping controlling apparatus 110 according to the fourth embodiment, the determination whether or not the sprung vibration damping is prohibited is executed based on the temperature of the battery 14. However, when the temperature of the battery 14 cannot be detected, other temperature may be substituted for the temperature of the battery 14, and, for example, the temperatures of cooling water of the engine 5 and the inverter 13, a intake air temperature, an external air temperature, an oil noise, and the like may be used as the substitutes. When a temperature is increased by executing the sprung vibration damping by controlling the motor 10, not only the battery 14 is deteriorated but also the temperature of the inverter 13 which supplies power to the motor 10 is also increased. Further, when the power of the battery 14 is consumed at the time the motor 10 is operated in the sprung vibration damping control, since the load of the engine 5 is also increased to charge the consumed power, the temperatures of cooling water and the oil of the engine 5 are also increased. That is, when the sprung vibration damping is executed by controlling the motor 10, since the loads of the inverter 13, the engine 5, and the like increase, the temperature of the cooling water of the inverter 13, the engine 5, and the like are increased. Accordingly, when the temperatures of the cooling water and the like are high, it can be determined that the loads of the engine 5, the inverter 13, and the like are in a large state. Thus, the life of the engine 5 and the like can be protected by prohibiting the sprung vibration damping when the temperatures of the cooling water of the engine 5 and the inverter 13, the intake air temperature, the external air temperature, the oil noise, and the like are equal to or more than predetermined threshold values. As a result, it can be suppressed that the other control is under the influence of the execution of the sprung vibration damping control.

Further, in the vibration-damping controlling apparatuses 2, 90, 100, 110, 120 according to the first to fifth embodiments, the sprung vibration damping is prohibited in the state that there is a possibility that the other control is under the influence of the execution of the sprung vibration damping control. However, in the state, the sprung vibration damping may be restricted in place of prohibiting the sprung vibration damping. In the restriction, the gain of the sprung vibration damping control may be set smaller than 1 likewise, for example, that the sprung vibration damping control is restricted in the vibration-damping controlling apparatus 130 according to the sixth embodiment by making the sprung vibration damping control gain GC smaller than 1 while the charge/discharge amount feedback control is executed, an upper limit value may set to the control amount of the sprung vibration damping control, or the power used in the sprung vibration damping control may be restricted.

Likewise, also in the vibration-damping controlling apparatus 130 according to the sixth embodiment, the sprung vibration damping may be restricted by setting an upper limit value to the control amount of the sprung vibration damping and restricting the power used in the sprung vibration damping in place of restricting the sprung vibration damping by making the sprung vibration damping control gain GC smaller than 1. Further, in the vibration-damping controlling apparatus 130 according to the sixth embodiment, although the sprung vibration damping is restricted while the charge/discharge amount feedback control is executed, the sprung vibration damping may be prohibited while the charge/discharge amount feedback control is executed.

As described above, in a state in which there is a possibility that it is difficult to appropriately execute the sprung vibration damping, in a state in which the battery 14 is liable to be deteriorated, and further in a state in which there is a possibility that the sprung vibration damping control interferes with the other control, the sprung vibration damping, which is executed by controlling the torque of the motor 10, can be restricted by being subjected to a restriction including a prohibition in response to a state of the battery 14 such as the voltage, the temperature, and the like of the battery 14 that supplies power to the motor 10 or to a state of the control such as the charge/discharge amount feedback control and the like that makes an influence on the power of the battery 14. With the operation, since the sprung vibration damping control can be executed in a state that the control is compromised as necessary, the sprung vibration damping control and the other control can be appropriately executed. As a result, it can be suppressed that the other control is under the influence of the execution of the sprung vibration damping control.

INDUSTRIAL APPLICABILITY

As described above, the vibration-damping controlling apparatus according to the present invention is useful for a vibration-damping controlling apparatus that executes a sprung vibration damping control and, in particular, is suitable when a vehicle that executes the sprung vibration damping control is a hybrid vehicle.

The invention claimed is:
1. A vibration-damping controlling apparatus comprising:
a controller configured to control an engine, a motor, or a generator of a vehicle and suppress sprung vibration generated to the vehicle by an input from a road surface to wheels provided with the vehicle by controlling a driving force of the vehicle,
wherein
a sprung vibration damping as a suppression of the sprung vibration is executed by the controller by controlling a torque of a motor disposed as a power source when at least the vehicle travels,
the sprung vibration damping, which is executed by the controller by controlling the torque of the motor, is restricted in response to any one of a state of a battery which supplies power to the motor and a state of a control which makes an influence on a power of the battery,
the vehicle further includes an internal combustion engine as a power source in traveling,
the sprung vibration damping is restricted by the controller at a time at which the internal combustion engine starts, or the internal combustion engine stops,
the sprung vibration damping is restricted by the controller at a time at which the internal combustion engine starts, or the internal combustion engine stops as well as when a voltage of the battery is equal to or more than an upper limit threshold value, or the voltage of the battery is equal to or less than a lower limit threshold value, and
the sprung vibration damping is not restricted by the controller when the voltage of the battery is between the upper limit threshold value and the lower limit threshold value even when the internal combustion engine starts or stops.
2. The vibration-damping controlling apparatus according to claim 1, wherein the upper limit threshold value and the lower limit threshold value of the voltage of the battery are changed by a temperature of the battery.
3. The vibration-damping controlling apparatus according to claim 1, wherein
the controller rotates the internal combustion engine by the output generated by the motor when the internal combustion engine starts and compensates a decelerating force of an engine brake by causing the motor to regenerate when the internal combustion engine stops.

* * * * *